(12) United States Patent
Farmer et al.

(10) Patent No.: US 7,953,325 B2
(45) Date of Patent: May 31, 2011

(54) SYSTEM AND METHOD FOR COMMUNICATING OPTICAL SIGNALS BETWEEN A DATA SERVICE PROVIDER AND SUBSCRIBERS

(75) Inventors: James O. Farmer, Lilburn, GA (US);
John J. Kenny, Norcross, GA (US);
Patrick W. Quinn, Lafayette, CA (US);
Thomas A. Tighe, Alpharetta, GA (US);
Paul F. Whittlesey, Sugar Hill, GA (US); Emmanuel A. Vella, Alpharetta, GA (US)

(73) Assignee: Enablence USA FTTX Networks, Inc., Alpharetta, GA (US)

( * ) Notice: Subject to any disclaimer, the term of this patent is extended or adjusted under 35 U.S.C. 154(b) by 0 days.

(21) Appl. No.: 12/548,416

(22) Filed: Aug. 26, 2009

(65) Prior Publication Data
US 2010/0046947 A1    Feb. 25, 2010

(51) Int. Cl.
H04B 10/00    (2006.01)
(52) U.S. Cl. ............... 398/72; 398/71; 398/70; 398/141
(58) Field of Classification Search ............... 398/66–72
See application file for complete search history.

(56) References Cited

U.S. PATENT DOCUMENTS

| | | |
|---|---|---|
| 4,253,035 A | 2/1981 | Amitay |
| 4,295,005 A | 10/1981 | Daugherty et al. |
| 4,495,545 A | 1/1985 | Dufresne et al. |
| 4,500,990 A | 2/1985 | Akashi |
| 4,654,891 A | 3/1987 | Smith |
| 4,655,517 A | 4/1987 | Bryce |
| 4,665,517 A | 5/1987 | Widmer |
| 4,733,398 A | 3/1988 | Shibagaki et al. |
| 4,763,317 A * | 8/1988 | Lehman et al. ............... 370/358 |
| 4,805,979 A | 2/1989 | Bossard et al. |
| 4,852,023 A | 7/1989 | Lee et al. |

(Continued)

FOREIGN PATENT DOCUMENTS

CA    2107922 A1    4/1995

(Continued)

OTHER PUBLICATIONS

Miki, Tetsuya et al., "A Design Concept on Fiber-Optic Wavelength-Division-Multiplexing Subscaiber Loop System" WTG—Fachber, 1980, pp. 41-45.

(Continued)

*Primary Examiner* — Agustin Bello
(74) *Attorney, Agent, or Firm* — Smith Risley Tempel Santos; Steven P. Wigmore

(57) ABSTRACT

An optical fiber network can include an outdoor laser transceiver node that can be positioned in close proximity to the subscribers of an optical fiber network. The outdoor laser transceiver node does not require active cooling and heating devices that control the temperature surrounding the laser transceiver node. The laser transceiver node can adjust a subscriber's bandwidth on a subscription basis or on an as-needed basis. The laser transceiver node can also offer data bandwidth to the subscriber in preassigned increments. Additionally, the laser transceiver node lends itself to efficient upgrading that can be performed entirely on the network side. The laser transceiver node can also provide high speed symmetrical data transmission. Further, the laser transceiver node can utilize off-the-shelf hardware to generate optical signals such as Fabry-Perot (F-P) laser transmitters, distributed feed back lasers (DFB), or vertical cavity surface emitting lasers (VCSELs).

20 Claims, 13 Drawing Sheets

U.S. PATENT DOCUMENTS

| | | | |
|---|---|---|---|
| 4,891,694 A * | 1/1990 | Way | 725/114 |
| 4,945,541 A | 7/1990 | Nakayama | |
| 4,956,863 A | 9/1990 | Goss | |
| 4,975,899 A * | 12/1990 | Faulkner | 398/66 |
| 5,029,333 A * | 7/1991 | Graves et al. | 370/490 |
| 5,099,471 A * | 3/1992 | Tsukada et al. | 398/98 |
| 5,105,336 A | 4/1992 | Jacoby et al. | |
| 5,121,240 A * | 6/1992 | Acampora | 398/101 |
| 5,132,992 A | 7/1992 | Yurt et al. | |
| 5,144,267 A | 9/1992 | West, Jr. | |
| 5,179,591 A | 1/1993 | Hardy et al. | |
| 5,189,725 A | 2/1993 | Bensel, III et al. | |
| 5,247,347 A | 9/1993 | Litteral et al. | |
| 5,249,194 A | 9/1993 | Sakanushi | |
| 5,253,250 A | 10/1993 | Schlafer et al. | |
| 5,253,275 A | 10/1993 | Yurt et al. | |
| 5,301,050 A * | 4/1994 | Czerwiec et al. | 398/30 |
| 5,303,295 A | 4/1994 | West et al. | |
| 5,313,546 A | 5/1994 | Toffetti | |
| 5,325,223 A | 6/1994 | Bears | 359/137 |
| 5,345,504 A | 9/1994 | West, Jr. | |
| 5,349,457 A | 9/1994 | Bears | 359/118 |
| 5,365,585 A | 11/1994 | Puhl et al. | |
| 5,365,588 A | 11/1994 | Bianco et al. | |
| 5,378,174 A | 1/1995 | Brownlie et al. | |
| 5,402,315 A | 3/1995 | Reichle | |
| 5,412,498 A | 5/1995 | Arstein et al. | |
| 5,432,875 A | 7/1995 | Korkowski et al. | |
| 5,469,507 A | 11/1995 | Canetti et al. | |
| 5,495,549 A | 2/1996 | Schneider et al. | |
| 5,509,099 A | 4/1996 | Hermsen et al. | |
| 5,510,921 A * | 4/1996 | Takai et al. | 398/79 |
| 5,517,346 A * | 5/1996 | Eckstein et al. | 398/161 |
| 5,528,455 A | 6/1996 | Miles | |
| 5,528,582 A | 6/1996 | Bodeep et al. | |
| 5,534,912 A | 7/1996 | Kostreski | |
| 5,541,917 A * | 7/1996 | Farris | 370/352 |
| 5,550,863 A | 8/1996 | Yurt et al. | |
| 5,557,317 A * | 9/1996 | Nishio et al. | 725/92 |
| 5,559,858 A | 9/1996 | Beveridge | 379/56.2 |
| 5,566,099 A | 10/1996 | Shimada | |
| 5,572,347 A * | 11/1996 | Burton et al. | 398/71 |
| 5,572,348 A | 11/1996 | Carlson et al. | |
| 5,572,349 A | 11/1996 | Hale et al. | 359/137 |
| 5,574,586 A * | 11/1996 | Chu et al. | 398/53 |
| 5,610,744 A | 3/1997 | Ho et al. | |
| 5,666,487 A | 9/1997 | Goodman et al. | |
| 5,687,014 A * | 11/1997 | Czerwiec et al. | 398/75 |
| 5,694,232 A | 12/1997 | Parsay et al. | |
| 5,701,186 A | 12/1997 | Huber | |
| 5,703,706 A * | 12/1997 | Eckstein et al. | 398/80 |
| 5,706,303 A | 1/1998 | Lawrence | |
| 5,715,020 A | 2/1998 | Kuroiwa et al. | |
| 5,731,546 A | 3/1998 | Miles et al. | |
| RE35,774 E | 4/1998 | Moura et al. | |
| 5,767,895 A * | 6/1998 | Yashiro et al. | 725/106 |
| 5,769,159 A | 6/1998 | Yun | |
| 5,778,017 A | 7/1998 | Sato et al. | |
| 5,781,320 A * | 7/1998 | Byers | 398/56 |
| 5,786,918 A * | 7/1998 | Suzuki et al. | 398/98 |
| 5,790,523 A | 8/1998 | Ritchie, Jr. et al. | |
| 5,793,413 A | 8/1998 | Hylton et al. | |
| 5,793,506 A * | 8/1998 | Schmid | 398/72 |
| 5,799,088 A | 8/1998 | Raike | |
| 5,802,089 A | 9/1998 | Link | |
| 5,815,295 A * | 9/1998 | Darcie et al. | 398/72 |
| 5,822,102 A | 10/1998 | Bodeep et al. | |
| 5,841,560 A * | 11/1998 | Prucnal | 398/101 |
| 5,861,966 A | 1/1999 | Ortel | |
| 5,867,485 A | 2/1999 | Chambers et al. | |
| 5,875,430 A | 2/1999 | Koether | |
| 5,880,864 A * | 3/1999 | Williams et al. | 398/71 |
| 5,892,865 A | 4/1999 | Williams | |
| 5,926,297 A * | 7/1999 | Ishikawa et al. | 398/43 |
| 5,926,303 A * | 7/1999 | Giebel et al. | 398/117 |
| 5,953,690 A | 9/1999 | Lemon et al. | |
| 5,969,536 A | 10/1999 | Foltzer | |
| 5,974,063 A | 10/1999 | Yoshida | |
| 6,002,692 A | 12/1999 | Wills | |
| 6,002,720 A | 12/1999 | Yurt et al. | |
| 6,041,056 A * | 3/2000 | Bigham et al. | 370/395.64 |
| 6,097,159 A | 8/2000 | Mogi et al. | |
| 6,097,515 A * | 8/2000 | Pomp et al. | 398/45 |
| 6,144,702 A | 11/2000 | Yurt et al. | |
| 6,151,343 A | 11/2000 | Jurgensen | |
| 6,167,553 A | 12/2000 | Dent | |
| 6,198,558 B1 * | 3/2001 | Graves et al. | 398/135 |
| RE37,125 E | 4/2001 | Carlson et al. | |
| 6,215,939 B1 | 4/2001 | Cloud | |
| 6,229,701 B1 | 5/2001 | Kung et al. | |
| 6,229,788 B1 * | 5/2001 | Graves et al. | 370/230 |
| 6,295,148 B1 | 9/2001 | Atlas | 359/125 |
| 6,300,562 B1 | 10/2001 | Daoud | |
| 6,330,155 B1 | 12/2001 | Remsburg | |
| 6,336,201 B1 | 1/2002 | Geile et al. | |
| 6,342,004 B1 | 1/2002 | Lattimore et al. | |
| 6,356,369 B1 | 3/2002 | Farhan | |
| 6,360,320 B1 | 3/2002 | Ishiguro et al. | |
| 6,362,908 B1 * | 3/2002 | Kimbrough et al. | 398/164 |
| 6,385,366 B1 | 5/2002 | Lin | 385/24 |
| 6,421,150 B2 | 7/2002 | Graves et al. | |
| 6,424,656 B1 | 7/2002 | Hoebeke | |
| 6,427,035 B1 | 7/2002 | Mahony | 385/15 |
| 6,449,408 B1 * | 9/2002 | Evans et al. | 385/27 |
| 6,452,714 B1 | 9/2002 | Rollins | |
| 6,457,178 B1 * | 9/2002 | Slim | 725/127 |
| 6,460,182 B1 | 10/2002 | BuAbbud | 725/126 |
| 6,463,068 B1 | 10/2002 | Lin et al. | |
| 6,483,635 B1 | 11/2002 | Wach | |
| 6,486,907 B1 | 11/2002 | Farber et al. | |
| 6,490,727 B1 | 12/2002 | Nazarathy et al. | |
| 6,493,335 B1 * | 12/2002 | Darcie et al. | 370/344 |
| 6,496,641 B1 | 12/2002 | Mahony | |
| 6,507,494 B1 | 1/2003 | Hutchison et al. | |
| 6,519,280 B1 | 2/2003 | Cole | |
| 6,529,301 B1 | 3/2003 | Wang | |
| 6,546,014 B1 | 4/2003 | Kramer et al. | |
| 6,577,414 B1 * | 6/2003 | Feldman et al. | 398/43 |
| 6,611,522 B1 | 8/2003 | Zheng et al. | |
| 6,621,975 B2 | 9/2003 | Laporte et al. | |
| 6,654,565 B2 | 11/2003 | Kenny | |
| 6,674,967 B2 | 1/2004 | Skrobko et al. | |
| 6,680,948 B1 | 1/2004 | Majd et al. | |
| 6,682,010 B2 | 1/2004 | Pohl | |
| 6,687,376 B1 | 2/2004 | Yamaguchi | |
| 6,687,432 B2 | 2/2004 | Schemmann et al. | |
| 6,707,024 B2 | 3/2004 | Miyamoto et al. | |
| 6,738,983 B1 | 5/2004 | Rao et al. | |
| 6,740,861 B2 | 5/2004 | Matsuda | |
| 6,771,614 B1 | 8/2004 | Jones, IV et al. | |
| 6,775,137 B2 | 8/2004 | Chu et al. | |
| 6,778,785 B2 | 8/2004 | Imajo | |
| 6,804,256 B2 | 10/2004 | Chang | |
| 6,804,354 B1 | 10/2004 | Driscoll | |
| 6,807,188 B1 * | 10/2004 | Blahut et al. | 370/442 |
| 6,814,328 B1 | 11/2004 | Li et al. | |
| 6,823,141 B2 * | 11/2004 | Miyauchi et al. | 398/147 |
| 6,823,385 B2 | 11/2004 | McKinnon, III et al. | |
| 6,889,007 B1 | 5/2005 | Wang et al. | |
| 6,895,023 B2 * | 5/2005 | Fice et al. | 370/509 |
| 6,912,075 B1 | 6/2005 | Ionov et al. | |
| 6,961,956 B2 | 11/2005 | Bontempi | |
| 6,973,271 B2 | 12/2005 | Farmer et al. | |
| 6,978,091 B1 * | 12/2005 | Needle | 398/72 |
| 7,007,297 B1 | 2/2006 | Woodward | |
| 7,023,871 B2 | 4/2006 | Lind et al. | |
| 7,043,164 B1 * | 5/2006 | Cotter | 398/175 |
| 7,062,171 B2 * | 6/2006 | Ota et al. | 398/67 |
| 7,149,223 B2 | 12/2006 | Liva et al. | |
| 7,155,128 B2 | 12/2006 | Roberts et al. | |
| 7,190,901 B2 | 3/2007 | Farmer et al. | |
| 7,190,903 B1 * | 3/2007 | Combs et al. | 398/71 |
| 7,218,855 B2 | 5/2007 | Whittlesey et al. | |
| 7,222,358 B2 | 5/2007 | Levinson et al. | |
| 7,227,871 B2 | 6/2007 | Dworkin et al. | |
| 7,242,694 B2 | 7/2007 | Beser | |
| 7,269,355 B2 | 9/2007 | Naoe et al. | |

| | | | |
|---|---|---|---|
| 7,277,637 B2 * | 10/2007 | Jette et al. ................... | 398/70 |
| 7,283,749 B1 * | 10/2007 | Combs et al. ................. | 398/72 |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0004362 A1 | 6/2001 | Kamiya | |
| 2001/0030785 A1 * | 10/2001 | Pangrac et al. ............. | 359/125 |
| 2002/0006197 A1 | 1/2002 | Carroll et al. | |
| 2002/0012138 A1 | 1/2002 | Graves et al. | |
| 2002/0021465 A1 | 2/2002 | Moore, Jr. et al. | |
| 2002/0027928 A1 | 3/2002 | Fang | |
| 2002/0039218 A1 | 4/2002 | Farmer et al. | |
| 2002/0063924 A1 * | 5/2002 | Kimbrough et al. ......... | 359/125 |
| 2002/0063932 A1 | 5/2002 | Unitt et al. | |
| 2002/0080444 A1 | 6/2002 | Phillips et al. | |
| 2002/0089725 A1 | 7/2002 | Farmer et al. | |
| 2002/0105965 A1 | 8/2002 | Dravida et al. | |
| 2002/0106178 A1 | 8/2002 | Bumgarner et al. | |
| 2002/0116719 A1 * | 8/2002 | Dapper et al. ............... | 725/116 |
| 2002/0135843 A1 | 9/2002 | Gruia | |
| 2002/0141159 A1 | 10/2002 | Bloemen | |
| 2002/0164026 A1 | 11/2002 | Huima | |
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0048512 A1 | 3/2003 | Ota | |
| 2003/0072059 A1 | 4/2003 | Thomas et al. | |
| 2003/0086140 A1 | 5/2003 | Thomas et al. | |
| 2003/0090320 A1 | 5/2003 | Skrobko et al. | |
| 2003/0128983 A1 * | 7/2003 | BuAbbud et al. ........... | 398/71 |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0028405 A1 | 2/2004 | Unitt et al. | |
| 2004/0052527 A1 | 3/2004 | Kirby | |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0264964 A1 * | 12/2004 | BuAbbud ..................... | 398/72 |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2006/0165413 A1 * | 7/2006 | Schemmann et al. ....... | 398/71 |
| 2007/0076717 A1 | 4/2007 | Limb et al. | |

FOREIGN PATENT DOCUMENTS

| | | |
|---|---|---|
| EP | 0713347 A2 | 5/1996 |
| EP | 0720322 A2 | 7/1996 |
| EP | 0 566 662 | 11/1999 |
| EP | 0955739 A2 | 11/1999 |
| EP | 0 933 892 | 10/2003 |
| JP | 7-20327 | 1/1995 |
| JP | 10-20123 | 1/1998 |
| JP | 11-305052 | 11/1999 |
| JP | 4-504433 | 3/2002 |
| MX | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | 03/001737 A3 | 1/2003 |
| WO | 03/005611 A2 | 1/2003 |
| WO | 03/005612 A1 | 1/2003 |
| WO | 03/019243 A2 | 3/2003 |
| WO | 03/021820 A1 | 3/2003 |
| WO | 03/023980 A2 | 3/2003 |
| WO | 03/079567 A1 | 9/2003 |
| WO | 03/090396 A2 | 10/2003 |
| WO | 2006/014433 A2 | 2/2006 |
| WO | 2006/020538 A2 | 2/2006 |
| WO | 2006/041784 A2 | 4/2006 |

OTHER PUBLICATIONS

International Search Report of Jul. 7, 2003 for PCT/US01/51350.
Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.
International Search Report of Jul. 2, 2003, for PCT/US03/07814.
International Search Report of Oct. 3, 2003 for PCT/US03/12231.
Ciciora, Walter S. et al., "Modern Cable Television Technology: Video, Voice, and Data Communications", © 1999, pp. 162-214, Chapter 4, Morgan Kaufmann Publishers, Inc., San Francisco, California.
Glaesemann, G. Scott et al., "The Mechanical Reliability of Corning® Optical Fiber in Bending White Paper", Sep. 2002, pp. 1-4.
Corning® SMF-28™ Optical Fiber Product Information, "Corning® Single-Mode Optical Fiber", Apr. 2002, pp. 1-4.
CEDaily Direct News, "Today's Report", Mar. 19, 2001, pp. 1-5.
Lucent Technologies, "Lucent Technologies Introduces Single-Fiber Network Access Devices for Voice, Video, and Data Services to the Home or Curb"; Jun. 6, 2000, pp. 1-2.
Lucent Technologies, "Agere Systems Introduces Single-Fiber Network Access Devices for Voice, Video and Data Services to the Home or Curb", Mar. 19, 2001, pp. 1-3.
Optical Networks Daily, A Publication of Optical Keyhole, Aug. 26, 2003, pp. 1-13.
Global Access™, Universal Services Gateway, USG100, Arris, pp. 1-2, Oct. 18, 2002.
Global Access™, Universal Access Switch, UAS4024, Arris, pp. 1-2, Aug. 28, 2002.
"Trading Update and Operational Review Presentation" Marconi, Sep. 4, 2001, pp. 1-35.
"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www.Marconi.com.
"Deep Fiber HFC Network Diagram" 1 pg, Marconi Corporation, PLC, 2002 at www.Marconi.com.
"Deep Fiber HFC Product Overview: New FITL Configuration" 2 pgs, Marconi Corporation, PLC, 2002 at www.Marconi.com.
"Deep Fiber HFC Technical Specifications" 2 pgs, Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Deep Fiber HFC" Marconi Corporation PLC 2000, pp. 1-2.
"Integrated Voice, Video and Data Services Over a Single Fiber: A Compelling Opportunity for Cable Operators" Marconi Corporation PLC, May 2000, 6 pgs.
"Deep Fiber Solutions: Advanced Broadband Services" Marconi Corporation PLC, May 2000, 5 pgs.
"Deep Fiber HFC: A Next-Generation Integrated Access Solution Offering Significant Improvement Over Traditional HFC Architectures" Marconi Corporation PLC, May 2000, 8 pgs.

"A Gold Mine of Opportunities in the Face of Increasing Competition: Choices for Utilities Entering the Communications Marketplace" Marconi Corporation PLC, May 2000, 6 pgs.
"Fiber Optics on New Development MDUs: A Research Summary," Marconi Corporation PLC, May 2000, 5 pgs.
"Thermal Management Challenges: Small ONU Enclosures," Marconi Corporation PLC, May 2000, 9 pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
G. Khoe et al., "Coherent Multicarrier Technology for Implementation in the Customer Access," IEEE, May/Jun. 1993, pp. 695-713.
L. Linnell, "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
"Digital Broadband Delivery System: Out of Band Transport—Mode A," Society of Cable Telecommunications Engineers, Inc., Aug. 26, 1998, 49 pgs.
B. Gaglianello & P. Thompson, "An Efficient MAC Layer Protocol for EPON," IEEE 802.3 EFM Nov. 2001, 9 pgs.
"Cisco IOS™ Software Quality of Service Solutions," Cisco Systems, Inc, 1998, 28 pgs.
International Search Report for PCT/US01/21298, 2 pgs, mailed Jun. 17, 2002.
International Search Report for PCT/US02/03056, 1 pg, mailed Jun. 12, 2002.
"Ethernet—Accelerating the Standard for Speed," 7 pgs, Gigabit Ethernet Alliance, Nov. 2000 at www.gigabit-ethernet.org.
"eLuminant—Asynchronous Transfer Mode (ATM) Passive Optical Networks (PONS) Tutorial" 28 pgs, the International Engineering Consortium, 2000 at www.iec.org.
International Search Report dated Dec. 4, 2002 for PCT/US02/27398.
International Search Report dated Dec. 17, 2002 for PCT/US02/15861.
Partial International Search Report dated Jan. 3, 2003 for PCT/US01/31032.
International Search Report dated Apr. 22, 2003 for PCT/US01/50361.
L. Zhang et al., "Label-switching architecture for IP traffic over WDM networks", IEE Proc.-Commun., vol. 147, No. 5, Oct. 2000, pp. 269-275.
J. Masip-Torne, et al., "Providing Differentiated Service Categories in Optical Packet Networks", Proceedings of the International Teletraffic Congress, ITC-16. Teletraffic Engineering in a Competitive World, Edinburgh, UK, Jun. 7-11, 1999, Teletraffic Science and Engineering, Amsterdam: Elsevier, NL, vol. 3B, Jun. 7, 1999, pp. 1115-1126.
J. Bannister et al., "How Many Wavelengths Do We Really Need? , A Study of the Performance Limits of Packet Over Wavelengths", Optical Networks Magazin, SPIE, Bellingham WA, vol. 1, No. 2, Apr. 2000, pp. 17-28.
O. W. W. Yang, et al. , "All-Optical WDM/TDM Star-Bus Network Using Optical Amplifiers", Journal of Optcal Communications, Fachverlage Schiele & Schon, Berlin, DE, vol. 16, No. 6, Dec. 1, 1995, pp. 216-226.
Walter Ciciora et al., "Modern Cable Television Technology: Video, Voice, and Data Communications", © 1999 by Morgan Kaufman Publishers, Inc., pp. 167-176.
International Search Report dated Apr. 21, 2003 for PCT/US02/28734.
Written Opinion dated May 6, 2003 for PCT/US01/21298.
McDevitt, F.R. Switched vs. Broadcast Video for Fibert-to-The-Home Systems, Communications, 1990. ICC 90, Including Supercomm Technical Sessions. Supercomm/ICC '90. Conference Record, IEEE International Conference on, Apr. 16-19, 1990.
Mangum, K.; Ko, D. Subscriber Loops and Services, 1988. Proceedings, ISSLS 88., International Symposium on, Sep. 11-16, 1988 pp. 208-212.
Bourne, John "Heathrow—Experience and Evolution" IEEE, 1990, 1901-1095.
Yamaguchi, K. "Broadband Access Network Based on Optical Signal Processing: The Photonic Highway" IEEE, 1990, 1030-1037.
McDevitt et al., Switched vs Broadcast Video for Fiber-to-the Home Systems, Alcatel Network Systems, 1990, IEEE, CH2829-0/90/0000-1109, pp. 1109-1119.
Mangun et al., Fiber to the Home Experience in Southern Bell, BellSouth Services and Northern Telecom, 1988, IEEE, CH2536-1/88/0000-0208, pp. 208-212.
Han et al., Burst-Mode Penalty of AC-Coupled Optical Receivers Optimized for 8B/10B Line Code, 2004, IEEE.
Coppinger et al., Nonlinear Raman Cross-Talk in a Video Overlay Passive Optical Network, 2003, Tuesday Afternoon, OFC 2003, vol. I, pp. 285-286.
Piehler et al., Nonlinear Raman Crosstalk in a 125-Mb/s CWDM Overlay on a 1310-nm Video Access Network, 2003, Optical Society of America.
Wong et al., 50-dB Nonlinear Crosstalk Suppression in a WDM Analog Fiber System by Complementary Modulation and Balanced Detection, 2003, IEEE, pp. 500-505.
McDevitt, F.R. Switched vs Broadcast Video for Fiber-to-the-Home Systems, Communications, 1990, ICC 90, Including Supercomm Technical Sessions. Supercomm/ICC '90, Conference Record., IEEE International Conference on, Apr. 16-19, 1990.
Mangum, K.; Ko, D. Subscriber Loops and Services, 1998, Proceedings, ISSLS 88., International Symposium on, Sep. 11-16, 1988 pp. 208-212.
Title: Spectral Grids for WDM Applications: CWDM Wavelength Grid Publ: *International Telecommunications Union* pp. i-iii and 1-4 Date: Dec. 1, 2003.
Title: PCT International Preliminary Report—PCT/US01/51350 pp. 1-5 Date: Apr. 11, 2005.
Title: PCT International Preliminary Exam Report—PCT/US03/12231 pp. 1-6 Date: Sep. 17, 2004.
Title: PCT International Preliminary Report—PCT/US03/07814 pp. 1-3 Date: Nov. 19, 2003.
Title: PCT International Written Opinion—PCT/US01/50361 pp. 1-6 Date: Feb. 11, 2004.
Title: PCT International Search Report—PCT/US02/27398 pp. 1-2 Date: Dec. 4, 2002.
Title: PCT International Search Report—PCT/US05/23847 pp. 1 Date: Apr. 18, 2006.
Title: PCT International Search Report—PCT/US05/28020 pp. 1 Date: Nov. 8, 2006.
Title: PCT International Search Report—PCT/US05/46419 pp. 1 Date: Feb. 14, 2007.
Title: PCT International Search Report—PCT/US06/11159 pp. 1 Date: Feb. 21, 2007.
Title: PCT International Search Report—PCT/US05/35512 pp. 1 Date: Oct. 25, 2006.
Author: Bonham Title: Trading Update and Operational Review Publ: www.Marconi.com pp. 1-35 Date: Sep. 4, 2001.
Author: Ciciora et al. Title: Video, Voice, and Data Communications Publ: *Modern Cable Television Technology* pp. 167-176 Date: Jan. 1, 1999.
Author: Effenberger Title: G.983 Video Return Path Publ: *International Telecommunications Union* pp. 1-18 Date: Oct. 1, 2004.
Author: Fludger et al. Title: Pump to Signal RIN Transfer in Raman Fiber Amplifiers Publ: *Journal of Lightwave Technology* vol./Iss: 19 (8) pp. 1140-1148 Date: Aug. 1, 2001.
Author: Tian et al. Title: Raman Crosstalk in Fiber-Optic Hybrid CATV Systems with Wide Channel Separations Publ: *IEEE Photonics Technology Letters* vol./Iss: 16 (1) pp. 344-346 Date: Jan. 1, 2004.

* cited by examiner

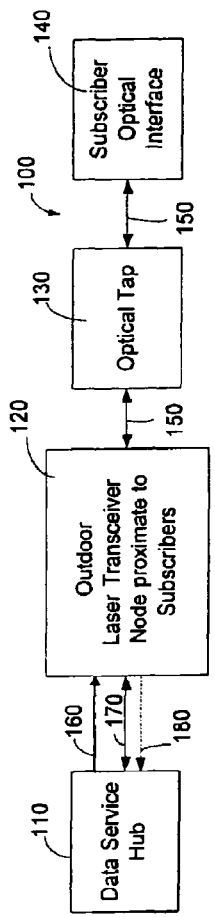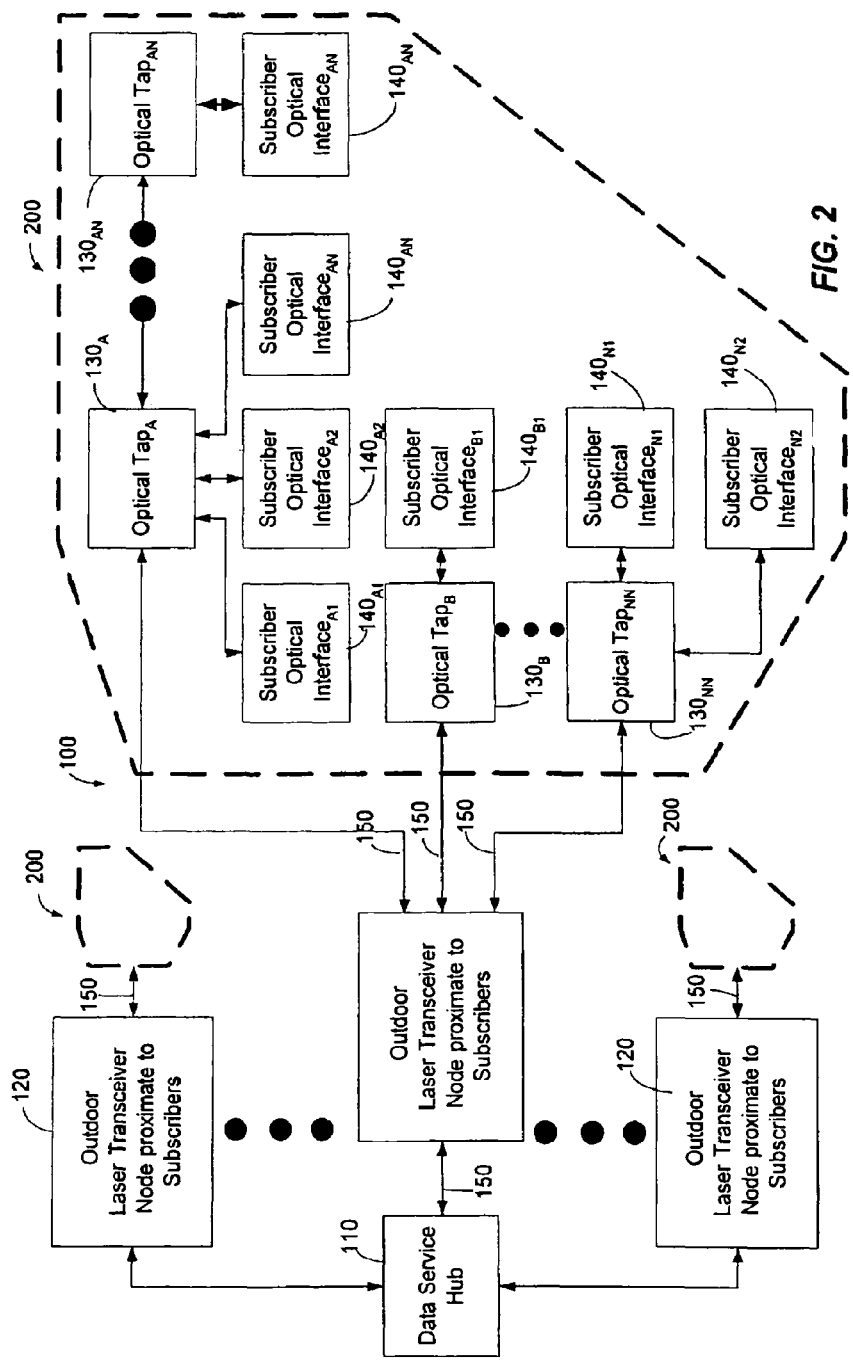

Data Service Hub
110

Laser Transceiver Node 120A

Data Service Hub 110B

Data Service Hub 110D

Laser Transceiver Node 120D

SYSTEM AND METHOD FOR COMMUNICATING OPTICAL SIGNALS BETWEEN A DATA SERVICE PROVIDER AND SUBSCRIBERS

STATEMENT AND PRIORITY CLAIM TO NON-PROVISIONAL APPLICATION

The present application claims priority to non-provisional patent application entitled, "System and Method for Communicating Optical Signals Between a Data Service Provider and Subscribers," filed on Aug. 3, 2007 and assigned U.S. application Ser. No. 11/890,277, the entire contents of which are incorporated by reference.

TECHNICAL FIELD

The present invention relates to video, voice, and data communications. More particularly, the present invention relates to a system and method for communicating optical signals between a data service provider and one or more subscribers.

BACKGROUND OF THE INVENTION

The increasing reliance on communication networks to transmit more complex data, such as voice and video traffic, is causing a very high demand for bandwidth. To resolve this demand for bandwidth, communication networks are relying more upon optical fibers to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

The Fiber-to-the-home (FTTH) optical network architecture has been a dream of many data service providers because of the aforementioned capacity of optical fibers that enable the delivery of any mix of high-speed services to businesses and consumers over highly reliable networks. Related to FTTH is fiber to the business (FTTB). FTTH and FTTB architectures are desirable because of improved signal quality, lower maintenance, and longer life of the hardware involved with such systems. However, in the past, the cost of FTTH and FTTB architectures have been considered prohibitive. But now, because of the high demand for bandwidth and the current research and development of improved optical networks, FTTH and FTTB have become a reality.

One example of a FTTH architecture that has been introduced by the industry is a passive optical network (PON). While the PON architecture does provide an all fiber network, it has many drawbacks that make such a system impractical to implement. One drawback of the PON architecture is that too many optical cables must originate at the head end or data service hub due to limitations in the number of times an optical signal can be divided before the signal becomes too weak to use. Another drawback can be attributed to the passive nature of a PON network. In other words, because there are no active signal sources disposed between the data service hub and the subscriber, the maximum distance that can be achieved between the data service hub and a subscriber usually falls within the range of 10 to 20 kilometers.

Another significant drawback of the PON architecture is the high cost of the equipment needed at the data service hub. For example, many PON architectures support the full service access network (FSAN) which uses the asynchronous transfer mode (ATM) protocol. To support this protocol, rather complex and expensive equipment is needed.

In addition to the high data service hub costs, conventional PON architectures do not lend themselves to efficient upgrades. That is, conventional or traditional PON architectures force physical reconfiguration of the network by adding fiber and router ports in order to increase the data speed of the network.

The data speeds in the downstream and upstream directions is another drawback of the PON architecture. Conventional PON architectures typically support up to 622 Megabit per second speeds in the downstream direction while only supporting maximum speeds of 155 Megabit per second speeds in the upstream direction. Such unbalanced communication speeds between the upstream and downstream communication directions is undesirable and is often referred to as asymmetrical bandwidth. This asymmetrical bandwidth places a low ceiling or low threshold for the amount of information that can be transferred from a subscriber to a data service hub. The assymetrical bandwidth is a result of the high cost of optical components required.

To overcome the asymmetrical bandwidth problem and the limited distance between the subscriber and the data service hub, a conventional hybrid fiber-to-the-home (FTTH)/hybrid fiber-coax (HFC) architecture has been proposed by the industry. HFC is currently the architecture of choice for many cable television systems. In this FTTH/HFC architecture, an active signal source is placed between the data service hub and the subscriber. Typically, in this architecture, the active signal source comprises a router. This conventional router has multiple data ports that are designed to support individual subscribers. More specifically, the conventional router uses a single port for each respective subscriber. Connected to each data port of the router is an optical fiber which, in turn, is connected to the subscriber. The connectivity between data ports and optical fibers with this conventional FTTH/HFC architecture yields a very fiber intensive last mile. It is noted that the terms, "last mile" and "first mile", are both generic terms used to describe the last portion of an optical network that connects to subscribers.

In addition to a high number of optical cables originating from the router, the FTTH/HFC architecture requires radio frequency signals to be propagated along traditional coaxial cables. Because of the use of coaxial cables, numerous radio frequency (RF) amplifiers are needed between the subscriber and the data service hub. For example, RF amplifiers are typically needed every one to three kilometers in a coaxial type system. The use of coaxial cables in the FTTH/HFC architecture adds to the overall cost of the system because two separate and distinct networks are present in such an architecture. In other words, the FTTH/HFC architecture has high maintenance costs because of the completely different waveguides (coaxial cable in combination with optical fiber) in addition to the electrical and optical equipment needed to support such two distinct systems. Stated more simply, the FTTH/HFC architecture merely combines an optical network with an electrical network where both networks run independently of one another.

Another drawback of the FTTH/HFC architecture is that the active signal source between the data service hub and subscriber, usually referred to as the router, requires a protected environment that occupies a significant amount of space. That is, the conventional router of the FTTH/HFC architecture requires an environmental cabinet that must maintain the router and related equipment at an optimum temperature. To maintain this optimum temperature, the environmental cabinet will typically include active temperature control devices for heating and cooling the cabinet.

Stated more simply, the conventional router of the FTTH/HFC architecture can only operate at standard room temperatures. Therefore, active cooling and heating units that consume power are needed to maintain such an operating temperature in all types of geographic areas and in all types of weather.

Unlike the FTTH/HFC architecture that employs two separate communication networks, another conventional hybrid fiber coax (HFC) architecture employs an active signal source between the data service hub and the subscriber that does not require a temperature controlled environmental cabinet. However, this active signal source disposed between the subscriber and the data service hub merely provides optical to electrical conversion of information signals. That is, the active signal source disposed between a subscriber and a data service hub in the HFC architecture converts downstream optical signals into electrical signals and upstream electrical signals into optical signals. The conventional HFC architecture relies upon coaxial cable to support all signals in the last mile or so of the HFC network. Therefore, similar to the FTTH/HFC architecture, the conventional HFC architecture also requires numerous RF amplifiers on the coaxial cable side of the network.

Another drawback of the conventional HFC architecture exists at the data service hub where numerous communication devices are needed to support the data signals propagating along the optical fibers between the active signal source and the data service hub. For example, the conventional HFC architecture typically supports telephony service by using equipment known generically as a host digital terminal (HDT). The HDT can include RF interfaces on the cable side, and interfaces to either a telephone switch or to a cable carrying signals to a switch on another side.

Further, the data service hub of a conventional HFC architecture can further include a cable modem termination system (CMTS). This system provides low level formatting and transmission functions for the data transmitted between the data service hub and the subscriber. The CMTS system can operate by-directionally, meaning that it can send signals both downstream to subscribers and receive signals sent upstream from subscribers.

In addition to a CMTS, the conventional HFC architecture at the data service hub typically includes several modulators that can comprise miniature television transmitters. Each modulator can convert video signals received from satellites to an assigned channel (frequency) for transmission to subscribers. In addition to the modulators, a signal processor and other devices are used to collect the entire suite of television signals to be sent to subscribers. Typically, in a conventional HFC architecture, there can be 78 or more such modulators or processors with their supporting equipment to service the analog TV tier. Additionally, similar equipment to serve the digital video tier is often used.

Another drawback of the conventional HFC architecture flows from the use of the CMTS. Similar to the passive optical network (PON) discussed above, the CMTS cannot support symmetrical bandwidth. That is, a bandwidth of the conventional HFC architecture is typically asymmetrical because of the use of the data over cable service interface specification (DOCSIS). The nature of the DOCSIS standard is that it limits the upstream bandwidth available to subscribers. This can be a direct result of the limited upstream bandwidth available in an HFC plant. Such a property is undesirable for subscribers who need to transmit more complex data for bandwidth intensive services such as home servers or the exchange of audio files over the Internet.

In another variation of the conventional HFC architecture, the CMTS can be part of the active signal source disposed between the subscriber and the data service hub. While this variation of the conventional HFC architecture enables the active signal source to perform some processing, the output of the active signal source in this architecture is still radio frequency energy and is propagated along coaxial cables.

Accordingly, there is a need in the art for a system and method for communicating optical signals between a data service provider and a subscriber that eliminates the use of coaxial cables and the related hardware and software necessary to support the data signals propagating along the coaxial cables. There is also a need in the art for a system and method for communicating optical signals between a data service provider and a subscriber that supports high speed symmetrical data transmission. In other words, there is a need in the art for an all fiber optical network and method that can propagate the same bit rate downstream and upstream to/from a network subscriber. Further, there is also a need in the art for an optical network system and method that can service a large number of subscribers while reducing the number of connections at the data service hub.

There is also a need in the art for an active signal source that can be disposed between a data service hub and a subscriber that can be designed to withstand outdoor environmental conditions and that can be designed to hang on a strand or fit in a pedestal similar to conventional cable TV equipment that is placed within a last mile of a communications network. A further need exists in the art for a system and method for receiving at least one gigabit or faster Ethernet communications in optical form from a data service hub and partition or apportion this optical bandwidth into distribution groups of a predetermined number. There is a further need in the art for a system and method that can allocate additional or reduced bandwidth based upon the demand of one or more subscribers on an optical network. Another need exists in the art for an optical network system that lends itself to efficient upgrading that can be performed entirely on the network side. In other words, there is a need in the art for an optical network system that allows upgrades to hardware to take place in locations between and within a data service hub and an active signal source disposed between the data service hub and a subscriber.

SUMMARY OF THE INVENTION

The present invention is generally drawn to a system and method for efficient propagation of data and broadcast signals over an optical fiber network. More specifically, the present invention is generally drawn to an optical network architecture that can include an outdoor laser transceiver, or processing node, that can be positioned in close proximity to the subscribers of an optical fiber network. For example, the outdoor laser transceiver node can be designed to withstand outdoor environmental conditions and can be designed to hang on a strand or fit in a pedestal similar to conventional cable TV equipment that is placed within "the last mile" of a network.

Unlike the conventional routers disposed between the subscriber optical interface and data service hub, the outdoor laser transceiver node does not require active cooling and heating devices that control the temperature surrounding the laser transceiver node. Further, the laser transceiver node can operate over a wide temperature range. Because the laser transceiver node does not require active temperature controlling devices, the laser transceiver node lends itself to a compact electronic packaging volume that is typically smaller than the environmental enclosures of conventional routers.

In contrast to conventional electronic cable TV equipment or conventional optical processing nodes, the laser transceiver node can receive at least one gigabit or faster Ethernet communications in optical form from the data service hub and partition or apportion this optical bandwidth into distribution groups of a predetermined number. In one exemplary embodiment, the laser transceiver node can partition the optical bandwidth into distribution groups comprising at least six groups of at least sixteen subscribers.

Using an appropriate protocol, the laser transceiver node can allocate additional or reduced bandwidth based upon the demand of one or more subscribers. That is, the laser transceiver node can adjust a subscriber's bandwidth on a subscription basis or on an as-needed basis. The laser transceiver node can offer data bandwidth to the subscriber in preassigned increments. For example, the laser transceiver node can offer a particular subscriber or groups of subscribers bandwidth in units of 1, 2, 5, 10, 20, 50, 100, 200, and 450 Megabits per second (Mb/s).

In addition to offering bandwidth in preassigned increments, the laser transceiver node lends itself to efficient upgrading that can be performed entirely on the network side. In other words, upgrades to the hardware forming the laser transceiver node can take place in locations between and within a data service hub (such as a headend) and the laser transceiver node themselves. This means that the subscriber side of the network can be left entirely intact during an upgrade to the laser transceiver node or data service hub or both.

The laser transceiver node can also provide high speed symmetrical data transmission. In other words, the laser transceiver node can propagate the same bit rates downstream and upstream from a network subscriber. Further, the laser transceiver node can also serve a larger number of subscribers while reducing the number of connections at the data service hub.

The flexibility and diversity of the laser transceiver node can be attributed to at least a few components. The laser transceiver node can comprise an optical tap routing device that is coupled to one or more tap multiplexers. The optical tap routing device can manage the interface with the data service hub optical signals and can route or divide or apportion the data service hub signals according to individual tap multiplexers that modulate laser transmitters to generate optical signals for specific optical taps. That is, unlike conventional routers which assign single ports to respective individual subscribers, the optical tap routing device can assign multiple subscribers to a single port. More specifically, each tap multiplexer connected to a port of the optical tap routing device can service groups of subscribers. The individual tap multiplexers can modulate laser transmitters to supply downstream optical signals to preassigned groups of subscribers coupled to optical taps. From the optical taps, subscribers can receive the downstream optical signals with subscriber optical interfaces.

The optical tap routing device can determine which tap multiplexer is to receive a downstream electrical signal, or identify which of the plurality of optical taps originated an upstream signal. The optical tap routing device can also format data and implement the protocol required to send and receive data from each individual subscriber connected to a respective optical tap (as will be discussed below). The optical tap routing device can comprise a computer or a hardwired apparatus that executes a program defining a protocol for communications with groups of subscribers assigned to single ports. The single ports are connected to respective tap multiplexers (discussed in further detail below).

The laser transceiver node further comprises off-the-shelf hardware to generate optical signals. For example, the laser transceiver node can comprise one or more Fabry-Perot (F-P) laser transmitters, distributed feed back lasers (DFBs), or vertical cavity surface emitting lasers (VCSELs). The laser transceiver node can also support unidirectional optical signals originating from the data service hub. The laser transceiver node can combine the unidirectional optical signals with downstream optical signals so that a single optical waveguide can connect the laser transceiver node to a respective subscriber. The unidirectional optical signals can comprise broadcast video or other similar RF modulated optical signals.

The laser transceiver node is but one part of the present invention. The present invention also comprises an efficient coupler, referred to as an optical tap, between the laser transceiver node and a respective subscriber optical interface. The optical tap can divide optical signals between a plurality of subscribers and can be simple in its design. For example, each optical tap can comprise an optical splitter that may feed one or more subscribers. Optical taps can be cascaded or they can be connected in a star architecture from the laser transceiver node. The optical tap can also route signals to other optical taps that are downstream relative to a respective optical tap. The optical tap can also connect to a small number of optical waveguides so that high concentrations of optical waveguides are not present at any particular laser transceiver node. In other words, the optical tap can connect to a predetermined number of optical waveguides at a point remote from the laser transceiver node so that high concentrations of optical waveguides at the laser transceiver node can be avoided.

As noted above, the optical tap and laser transceiver node are parts of the present invention. The present invention can include a system that comprises the optical tap, the laser transceiver node, a data service hub, a subscriber optical interface, and optical waveguides connected between the optical taps and laser transceiver node.

BRIEF DESCRIPTION OF THE DRAWINGS

FIG. 1 is a functional block diagram of some core components of an exemplary optical network architecture according to the present invention.

FIG. 2 is a functional block diagram illustrating an exemplary optical network architecture for the present invention.

DETAILED DESCRIPTION OF EXEMPLARY EMBODIMENTS

Figure 3:
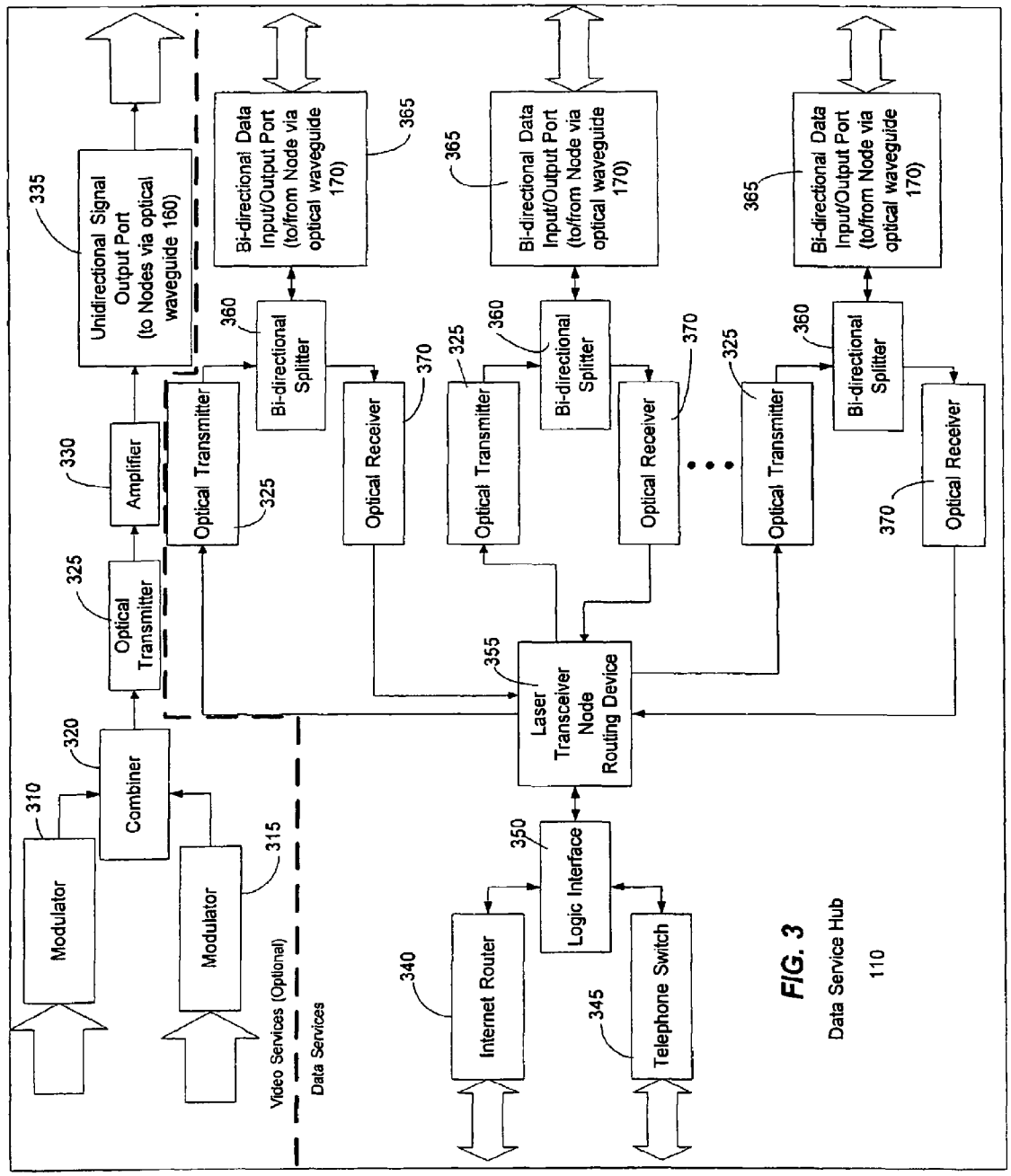
FIG. 3 is a functional block diagram illustrating an exemplary data service hub of the present invention.

The present invention may be embodied in hardware or software or a combination thereof disposed within an optical network. The present invention can comprise a laser transceiver node disposed between a data service hub and a subscriber that can allocate additional or reduced bandwidth based upon the demand of one or more subscribers. The present invention can support one gigabit or faster Ethernet communications in optical form to and from the data service hub and partition or apportion this optical bandwidth into distribution groups of a predetermined number. The present invention allows bandwidth to be offered to subscribers in preassigned increments. The flexibility and diversity of the present invention can be attributed to a few components.

The laser transceiver node of the present invention can comprise an optical tap routing device that is coupled to one or more tap multiplexers. The optical tap routing device can assign multiple subscribers to a single port that receives downstream optical signals from a data service hub. The laser transceiver node of the present invention can comprise off-the-shelf hardware to generate optical signals. For example, the laser transceiver node of the present invention can comprise one or more Fabry-Perot (F-P) lasers, distributed feedback lasers, or Vertical Cavity Surface Emitting Lasers (VCSELs) in the transmitters. The present invention can also comprise efficient couplers, such as optical taps, between the laser transceiver node and a respective subscriber optical interface.

The optical tap can divide optical signals among a plurality of subscribers and can be simple in its design. The optical tap can connect to a limited number of optical waveguides at a point remote from the laser transceiver node so that high concentrations of optical waveguides at the laser transceiver node can be avoided. In another exemplary embodiment, the optical tap can be disposed within the laser transceiver node of the present invention.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that is connected to outdoor laser transceiver nodes 120. The laser transceiver nodes 120, in turn, are connected to an optical taps 130. The optical taps 130 can be connected to a plurality of subscriber optical interfaces 140. Between respective components of the exemplary optical network architecture 100 are optical waveguides such as optical waveguides 150, 160, 170, and 180. The optical waveguides 150-180 are illustrated by arrows where the arrowheads of the arrows illustrate exemplary directions of data flow between respective components of the illustrative and exemplary optical network architecture 100. While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the present invention, multiple subscriber optical interfaces 140 are connected to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hard hole." The outdoor laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the outdoor laser transceiver node 120 does not require active cooling and heating devices that control the temperature surrounding the laser transceiver node 120. The present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIGS. 4, 7, 8, 10, 11, and 12.

In one exemplary embodiment of the present invention, three trunk optical waveguides 160, 170, and 180 (that can comprise optical fibers) can conduct optical signals from the data service hub 110 to the outdoor laser transceiver node 120. It is noted that the term "optical waveguide" used in the present application can apply to optical fibers, planar light guide circuits, and fiber optic pigtails and other like optical waveguides.

A first optical waveguide 160 can carry broadcast video and other signals. The signals can be carried in a traditional cable television format wherein the broadcast signals are modulated onto carriers, which in turn, modulate an optical transmitter (not shown) in the data service hub 110. A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170. In such an exemplary embodiment where the second optical waveguide 170 propagates bi-directional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 connected between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the outdoor laser transceiver node 120. In one exemplary embodiment, six optical fibers 150 are designed to be connected to the outdoor laser transceiver node 120. Through the use of the optical taps 130, sixteen subscribers can be assigned to each of the six optical fibers 150 that are connected to the outdoor laser transceiver node 120.

In another exemplary embodiment, twelve optical fibers 150 can be connected to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this exemplary embodiment, the second optical waveguide 170 supports bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a combiner 320 where they are supplied to an optical transmitter 325 where the radio frequency signals generated by the modulators 310, 315 are converted into optical form.

The optical transmitter 325 can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter (often referred to as the unidirectional optical signals) are propagated to amplifier 330 such as an Erbium Doped Fiber Amplifier (EDFA) where the unidirectional optical signals are amplified. The amplified unidirectional optical signals are then propagated out of the data service hub 110 via a unidirectional signal output port 335 which is connected to one or more first optical waveguides 160.

The unidirectional signal output port 335 is connected to one or more first optical waveguides 160 that support unidirectional optical signals originating from the data service hub 110 to a respective laser transceiver node 120. The data service hub 110 illustrated in FIG. 3 can further comprise an Internet router 340. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional means of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is connected to a second optical waveguide 170 that supports bi-directional optical data signals between the data service hub 110 and a respective laser transceiver node 120. Upstream optical signals received from a respective laser transceiver node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. Each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 4:
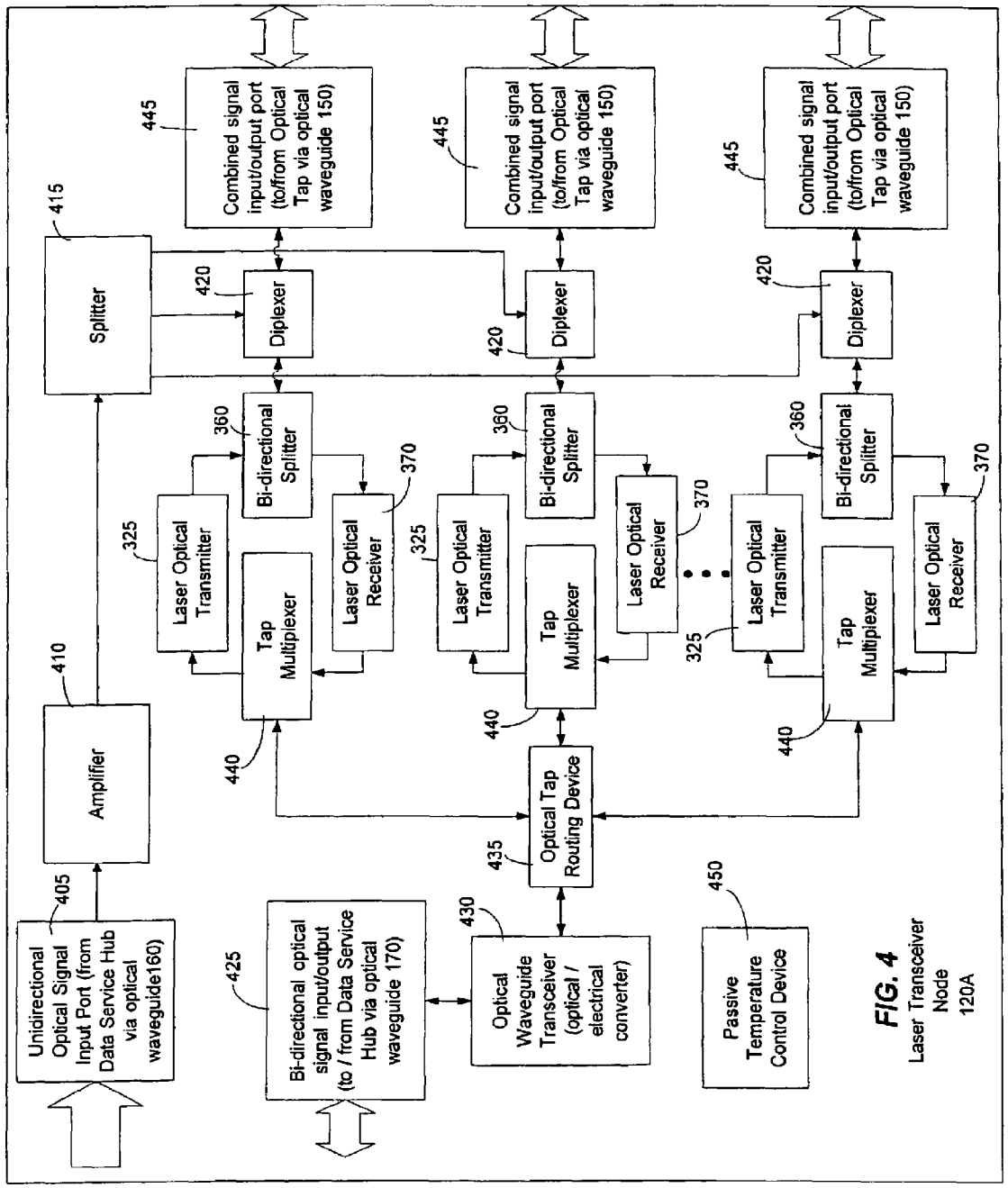
FIG. 4 is a functional block diagram illustrating an exemplary outdoor laser transceiver node according to the present invention.

Referring now to FIG. 4, this Figure illustrates a functional block diagram of an exemplary outdoor laser transceiver node 120 of the present invention. In this exemplary embodiment, the laser transceiver node 120 can comprise a unidirectional optical signal input port 405 that can receive optical signals propagated from the data service hub 110 that are propagated along a first optical waveguide 160. The optical signals received at the unidirectional optical signal input port 405 can comprise broadcast video data. The optical signals received at the input port 405 are propagated to an amplifier 410 such as an Erbium Doped Fiber Amplifier (EDFA) in which the optical signals are amplified. The amplified optical signals are then propagated to a splitter 415 that divides the broadcast video optical signals among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets as they arrive, by each tap multiplexer 440. The optical tap routing device is connected to each tap multiplexer 440 to receive these upstream data packets. The optical tap routing device 435 relays the packets to the data service hub 110 via the optical waveguide transceiver 430. The optical tap routing device 435 can build a lookup table from these upstream data packets coming to it from all tap multiplexers 440 (or ports), by reading the source IP address of each packet, and associating it with the tap multiplexer 440 through which it came. This lookup table can then used to route packets in the downstream path. As each packet comes in from the optical waveguide transceiver 430, the optical tap routing device looks at the destination IP address (which is the same as the source IP address for the upstream packets). From the lookup table the optical tap routing device can determine which port is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 is to receive a downstream electrical signal, or identify which of a plurality of optical taps 130 propagated an upstream optical signal (that is converted to an electrical signal). The optical tap routing device 435 can format data and implement the protocol required to send and receive data from each individual subscriber connected to a respective optical tap 130. The optical tap routing device 435 can comprise a computer or a hard-wired apparatus that executes a program defining a protocol for communications with groups of subscribers assigned to individual ports. One exemplary embodiment of the program defining the protocol is discussed in copending and commonly assigned provisional patent application entitled, "Protocol to Provide Voice and Data Services via Fiber Optic Cable," filed on Oct. 27, 2000 and assigned U.S. Application Ser. No. 60/243,978, the entire contents of which are incorporated by reference. Another exemplary embodiment of the program defining the protocol is discussed in copending and commonly assigned provisional patent application entitled, "Protocol to Provide Voice and Data Services via Fiber Optic Cable-Part 2," filed on May 7, 2001 and assigned U.S. Application Ser. No. 60/289,112, the entire contents of which are incorporated by reference.

The single ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5:
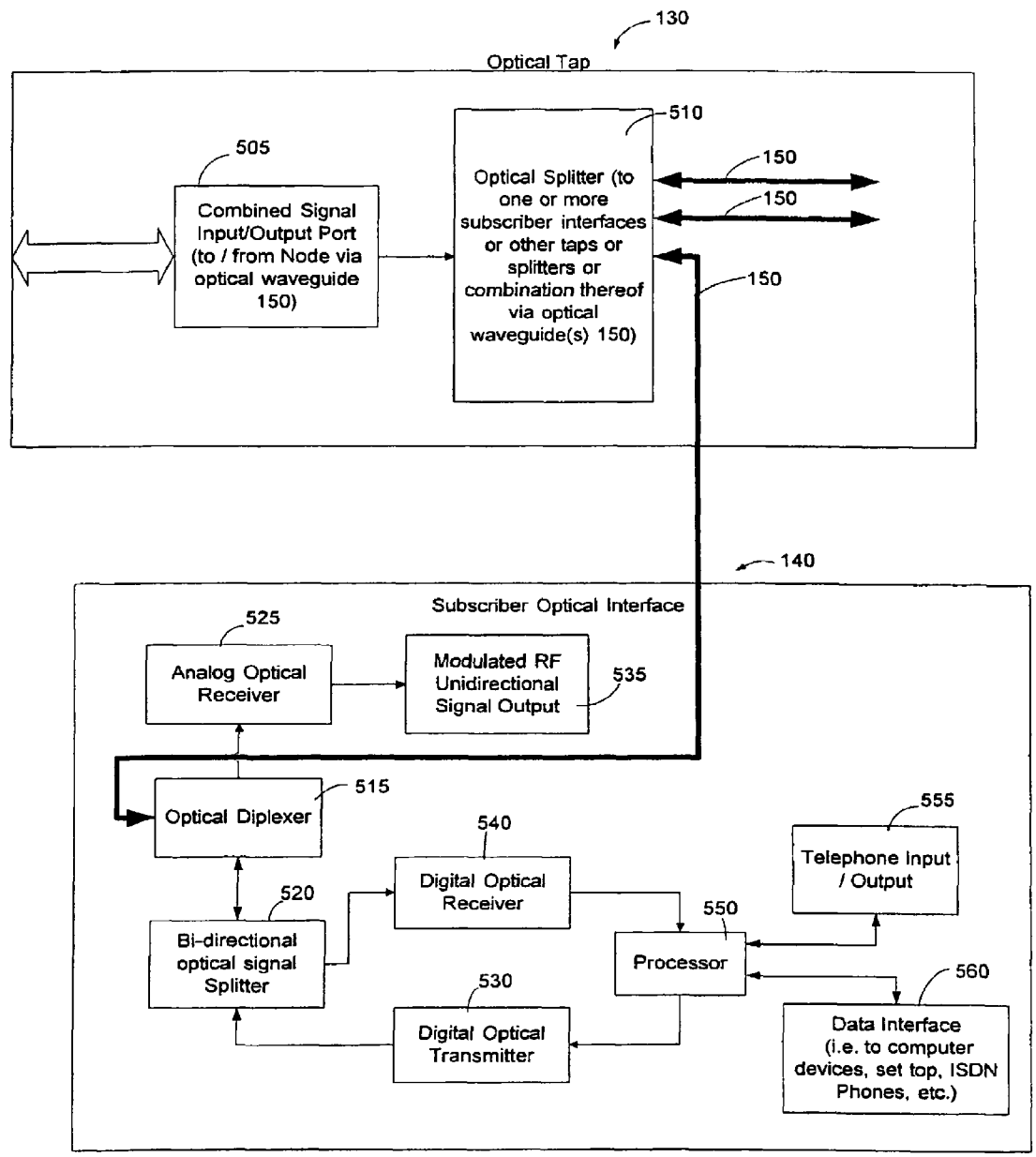
FIG. 5 is a functional block diagram illustrating an optical tap connected to a subscriber interface by a single optical waveguide according to one exemplary embodiment of the present invention.

Referring now to FIG. 5, this Figure is a functional block diagram illustrating an optical tap 130 connected to a subscriber optical interface 140 by a single optical waveguide 150 according to one exemplary embodiment of the present invention. The optical tap 130 can comprise a combined signal input/output port that is connected to another distribution optical waveguide that is connected to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention. The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

Figure 12:
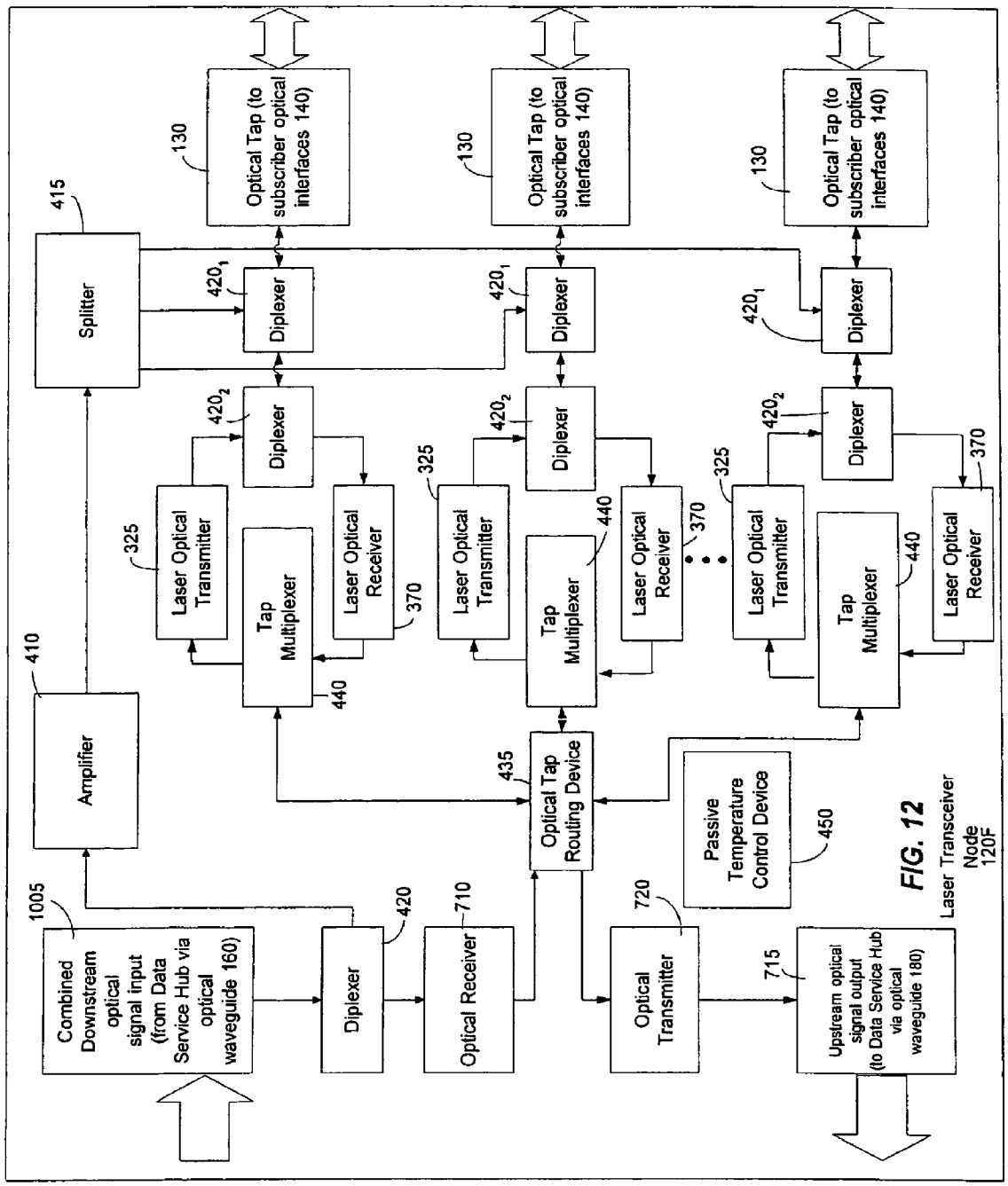
FIG. 12 is a functional block diagram illustrating another exemplary outdoor laser transceiver node that includes optical taps disposed within the laser transceiver node itself.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120 as will be discussed in further detail below with respect to another exemplary embodiment of the laser transceiver node 120 as illustrated in FIG. 12.

The subscriber optical interface 140 functions to convert downstream optical signals received from the optical tap 130 into the electrical domain that can be processed with appropriate communication devices. The subscriber optical interface 140 further functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals that are propagated out of the modulated RF unidirectional signal output 535. The modulated RF unidirectional signal output 535 can feed to RF receivers such as television sets (not shown) or radios (not shown). The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 555 that can comprise an analog interface. The processor 550 is also connected to a data interface 560 that can provide a link to computer devices, set top boxes, ISDN phones, and other like devices. Alternatively, the data interface 560 can comprise an interface to a Voice over Internet Protocol (VoIP) telephone or Ethernet telephone. The data interface 560 can comprise one of Ethernet's (10BaseT, 100BaseT, Gigabit) interface, HPNA interface, a universal serial bus (USB) an IEEE1394 interface, an ADSL interface, and other like interfaces.

Figure 6:
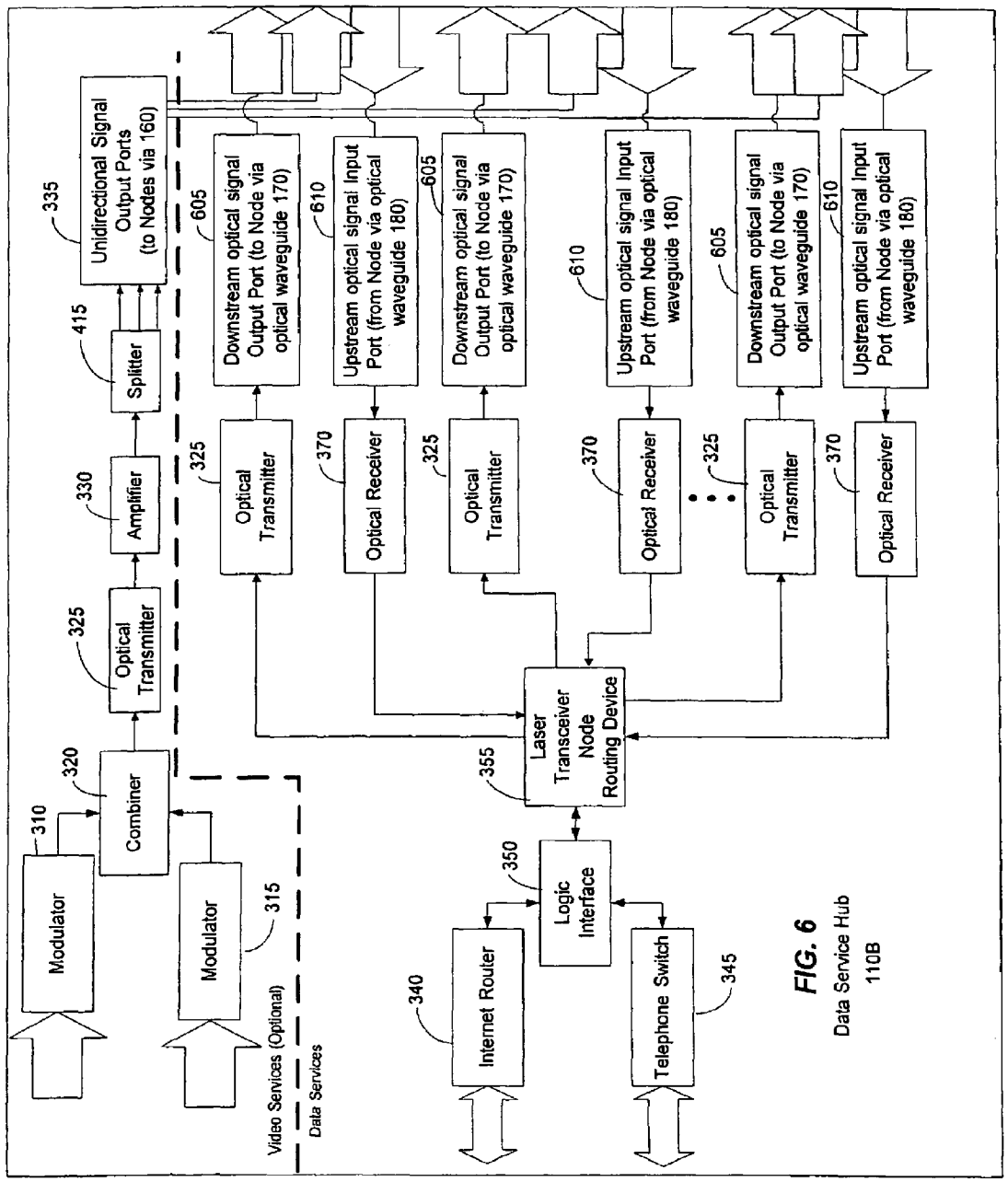
FIG. 6 is a functional block diagram illustrating an exemplary data service hub according to an alternative exemplary embodiment of the present invention where upstream optical signals and downstream optical signals are propagated along separate optical waveguides.

Referring now to FIG. 6, this figure is a functional block diagram illustrating an exemplary data service hub 110B according to an alternative exemplary embodiment of the present invention where upstream optical signals and downstream optical signals are propagated along separate optical waveguides such as the second optical waveguide 170 and the third optical waveguide 180 discussed above with respect to FIG. 1. In other words, in this exemplary embodiment, the second optical waveguide 170 is designed to carry only downstream optical signals while the third optical waveguide 180 is designed to carry only upstream optical signals from the laser transceiver node 120.

The exemplary data service hub 110B further comprises a downstream optical signal output port 605 that is coupled to the second optical waveguide 170. The data service hub 110B further comprises an upstream optical signal input port that is coupled to the third optical waveguide 180. With the exemplary data service hub 110B separate optical waveguides 180 and 170 carry the respective upstream and downstream optical transmissions. With this exemplary embodiment, power can be conserved since additional components that were previously used to combine and separate the upstream and downstream optical signals are eliminated.

This exemplary embodiment of the data service hub 110B can further reduce distance limitations due to power loss and cross talk. In other words, at each end of an optical transmitter, which is supplying a lot of optical power compared with the received power, can create interference at the receiver due to incomplete isolation between the upstream and downstream optical signal directions. By utilizing separate optical waveguides for the upstream and downstream optical signals, this interference can be substantially reduced or eliminated.

Figure 7:
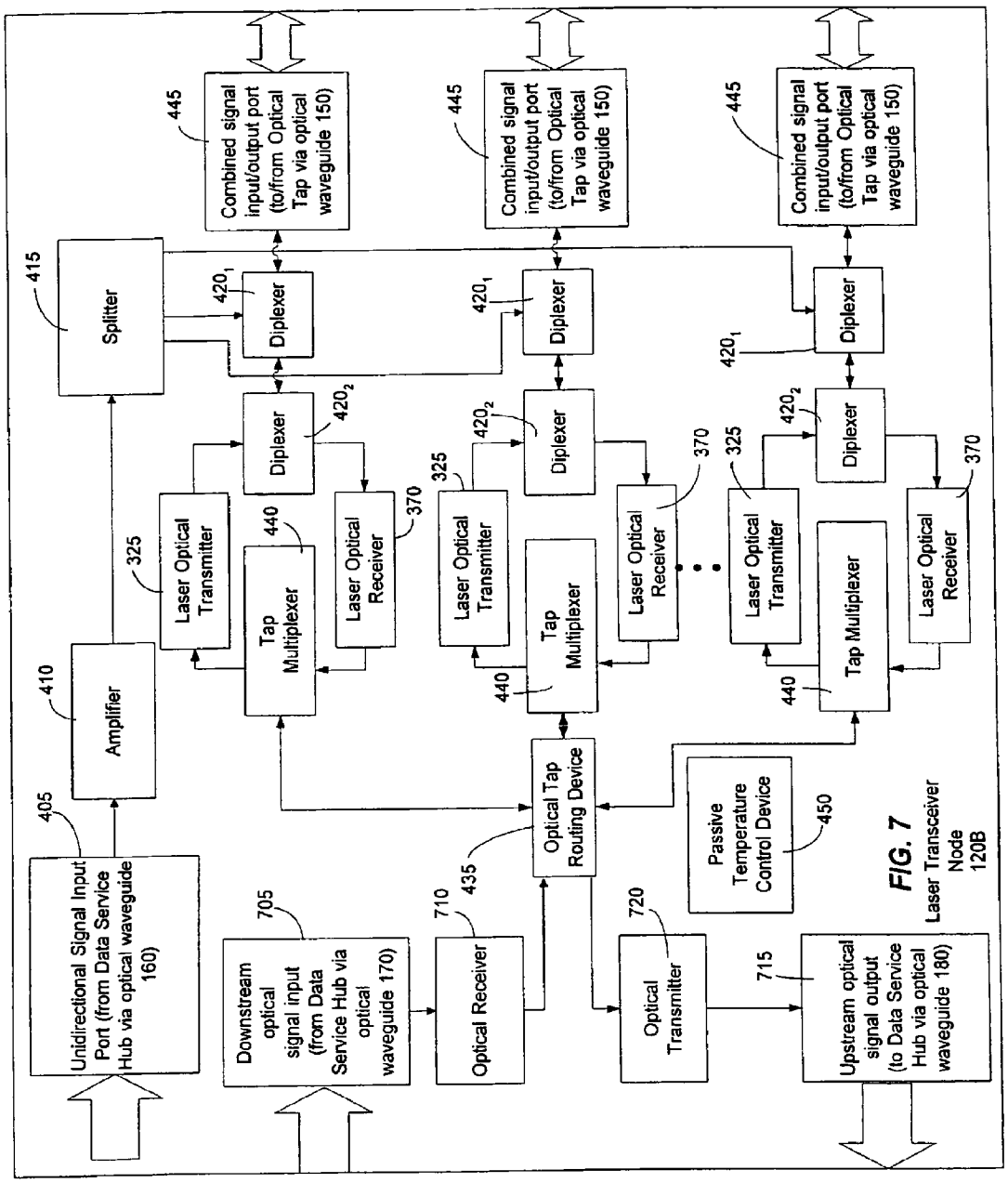
FIG. 7 is a functional block diagram illustrating an exemplary outdoor laser transceiver node that can accept upstream and downstream optical signals that are propagated along separate optical waveguides in addition to unidirectional signals that can be mixed with the downstream optical signals.

Referring now to FIG. 7, this Figure illustrates a functional block diagram of an exemplary outdoor laser transceiver node 120B that can accept upstream and downstream optical signals that are propagated along separate optical waveguides in addition to unidirectional signals that can be mixed with downstream optical signals. In other words, the laser transceiver node 120B can be coupled to the exemplary data service hub 110B illustrated in FIG. 6.

The laser transceiver node 120B can comprise a downstream optical signal input port 705 that is coupled to the second optical waveguide 170 as illustrated in FIG. 1. The downstream optical signal input port 705 is coupled to an optical receiver 710 that converts the downstream optical signals into the electrical domain. The optical receiver 710 in turn, feeds the electrical signals to the optical tap routing device 435.

The laser transceiver node 120B of FIG. 7 can further comprise an optical transmitter 720 that converts electrical signals received from the optical tap routing device 435 into the optical domain. The optical signals generated by the optical transmitter 720 are fed to an upstream optical signal output port 715. The upstream optical signal output port 715 is coupled to the third optical waveguide 180 as illustrated in FIG. 1. Compared to the exemplary laser transceiver node 120A illustrated in FIG. 4, the bi-directional splitter 360 has been replaced with a second diplexer 420$_2$. The optical transmitter 325 generates optical signals of a wavelength that is higher than the upstream optical signals produced by a respective subscriber optical interface 140. For example, in one exemplary embodiment, the optical transmitter 325 can produce optical signals having wavelengths between 1410 and 1490 nm while the upstream optical signals remain at the 1310 nm wavelength region.

As noted above, those skilled in the art will appreciate that the wavelengths discussed are only illustrative in nature. In some scenarios, it may be possible to use communication windows at 1310 and 1550 nm in different ways without departing from the scope and spirit of the present invention. Further, the present invention is not limited to the wavelength regions discussed above. Those skilled in the art will appreciate that smaller or larger wavelengths for the optical signals are not beyond the scope and spirit of the present invention.

Because of the difference in wavelength regions between the upstream and downstream optical signals, the additional diplexer 420 can be substituted for the previous bi-directional splitter 360 (illustrated in the exemplary embodiment of FIG. 4). The additional or substituted diplexer 420 does not exhibit the same loss as the previous bi-directional splitter 360 that is used in the exemplary embodiment of FIG. 4. This substitution of the bi-directional splitter 360 with the additional diplexer 420 can also be applied to the subscriber optical interface 140. That is, when the upstream and downstream optical signals are operating at respective different wavelength regions, the bi-directional optical signal splitter 520 of the subscriber optical interface 140 can be substituted with a diplexer 420. The substitution of the bi-directional splitter 360 with the diplexer 420 can reduce the optical loss between the laser transceiver node 120 and the subscriber optical interface 140.

Alternatively, if the laser transceiver node 120 is using the same wavelengths for the upstream and downstream optical signals, the optical interface 140 uses the bi-directional optical signal splitter 520 with a corresponding loss in optical power as illustrated in FIG. 5. Those skilled in the art will appreciate that various other substitutions for the components of the laser transceiver node 120 can be made without departing from the scope and spirit of the present invention.

Figure 8:
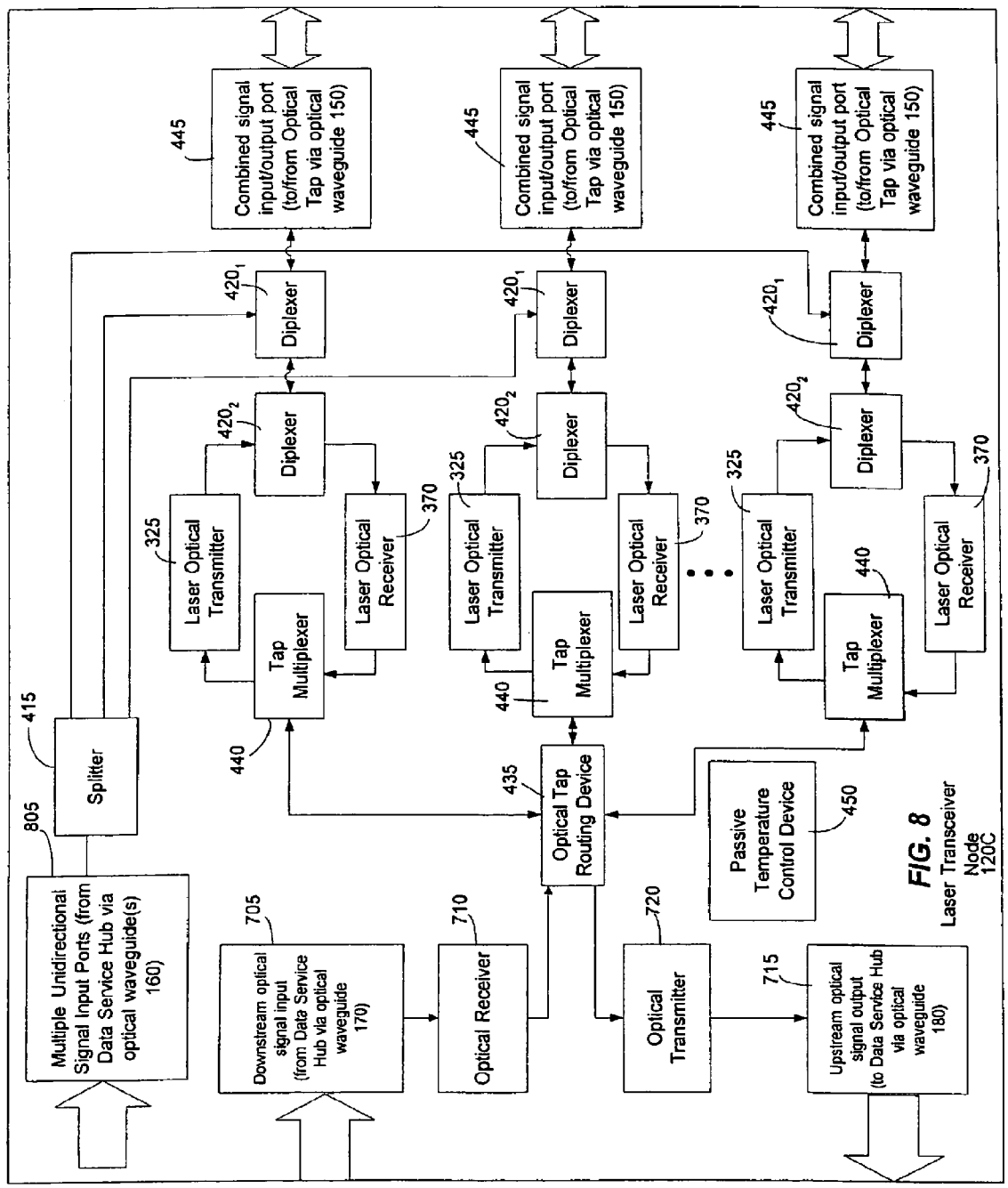
FIG. 8 is a functional block diagram illustrating yet another exemplary outdoor laser transceiver node that can accept optical signals propagating in separate upstream and downstream optical waveguides in addition to multiple optical waveguides that propagate unidirectional signals.

Referring now to FIG. 8, this Figure illustrates another exemplary outdoor, laser transceiver node 120C that can accept optical signals propagating from separate upstream and downstream optical waveguides in addition to multiple optical waveguides that propagate unidirectional signals. In this exemplary embodiment, the laser transceiver node 120C of FIG. 8 can comprise multiple unidirectional signal input ports 805 that are coupled to a plurality of first optical waveguides 160. In this exemplary embodiment, compared to the laser transceiver node 120A of FIG. 4 and laser transceiver node 120B of FIG. 7, the amplifier 410 has been removed from the laser transceiver node 120C as illustrated in FIG. 8. The amplifier 410 is taken out of the laser transceiver node 120C and placed in the data service hub 110.

The optical signals propagating from the multiple first optical waveguides 160 are combined with the upstream and downstream optical signals originating from the second set of diplexers $420_2$ using the first set of diplexers $420_1$. This design to remove the amplifier 410 (that typically comprises an Erbium Doped Fiber Amplifier—EDFA) from the laser transceiver node 120C of FIG. 8 to the data service hub 110 and to include multiple first optical waveguides 160 feeding into the laser transceiver node 120C, may be made on the basis of economics and optical waveguide availability.

Figure 9:
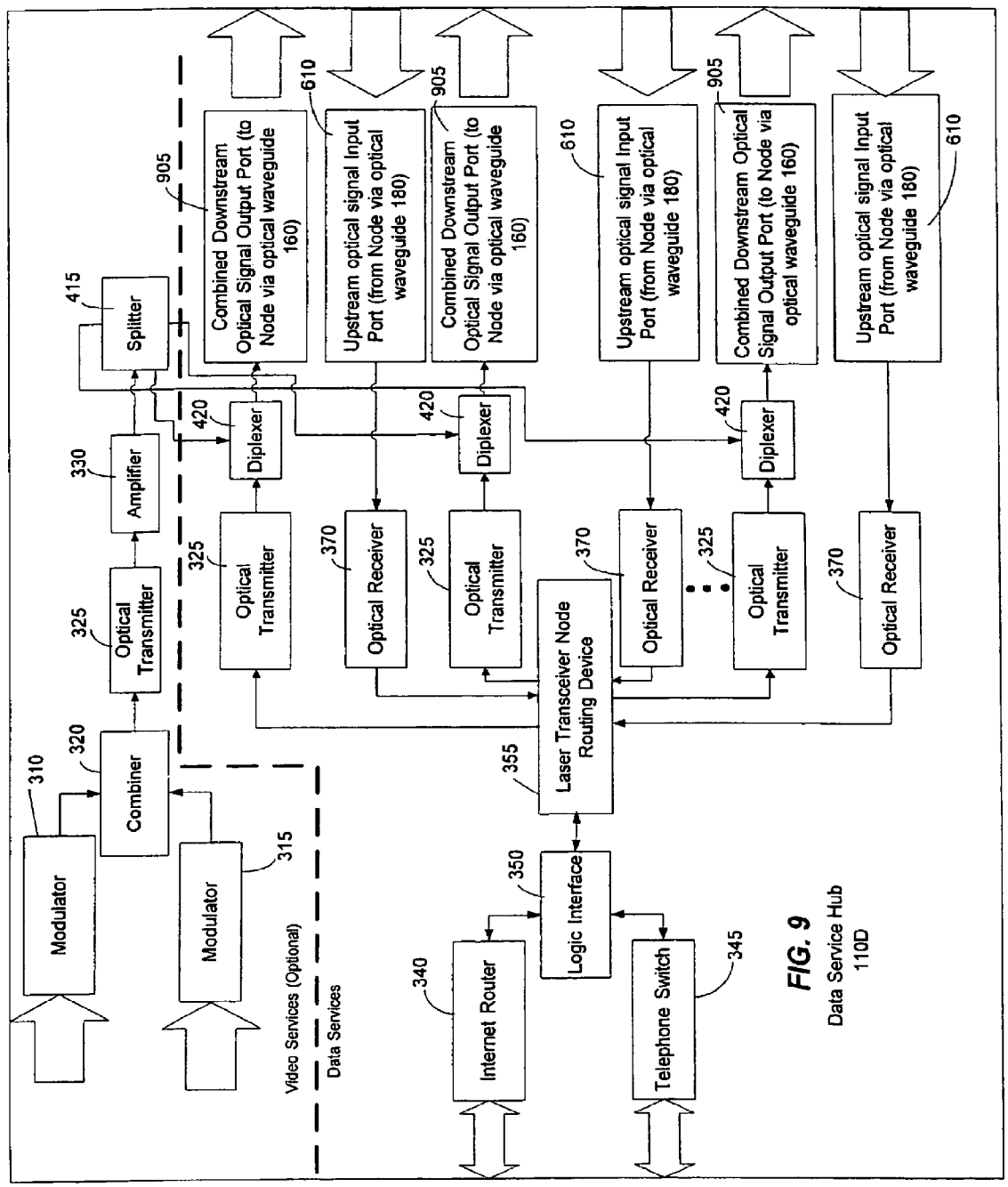
FIG. 9 is a functional block diagram illustrating another exemplary embodiment of a data service hub in which unidirectional signals such as video or RF signals are combined with downstream optical signals.

FIG. 9 illustrates another exemplary embodiment of a data service hub 110D in which unidirectional signals such as video or RF signals are combined with downstream optical signals. In this exemplary embodiment, the data service hub 110D further comprises a splitter 415 that feeds the broadcast video optical signals to respective diplexers 420. The respective diplexers 420 combine the broadcast video optical signals with the downstream data optical signals produced by respective optical transmitters 325. In this way, the first optical waveguide 160 as illustrated in FIG. 1 can be eliminated since the broadcast video optical signals are combined with the downstream data optical signals along the second optical waveguide 170.

Figure 10:
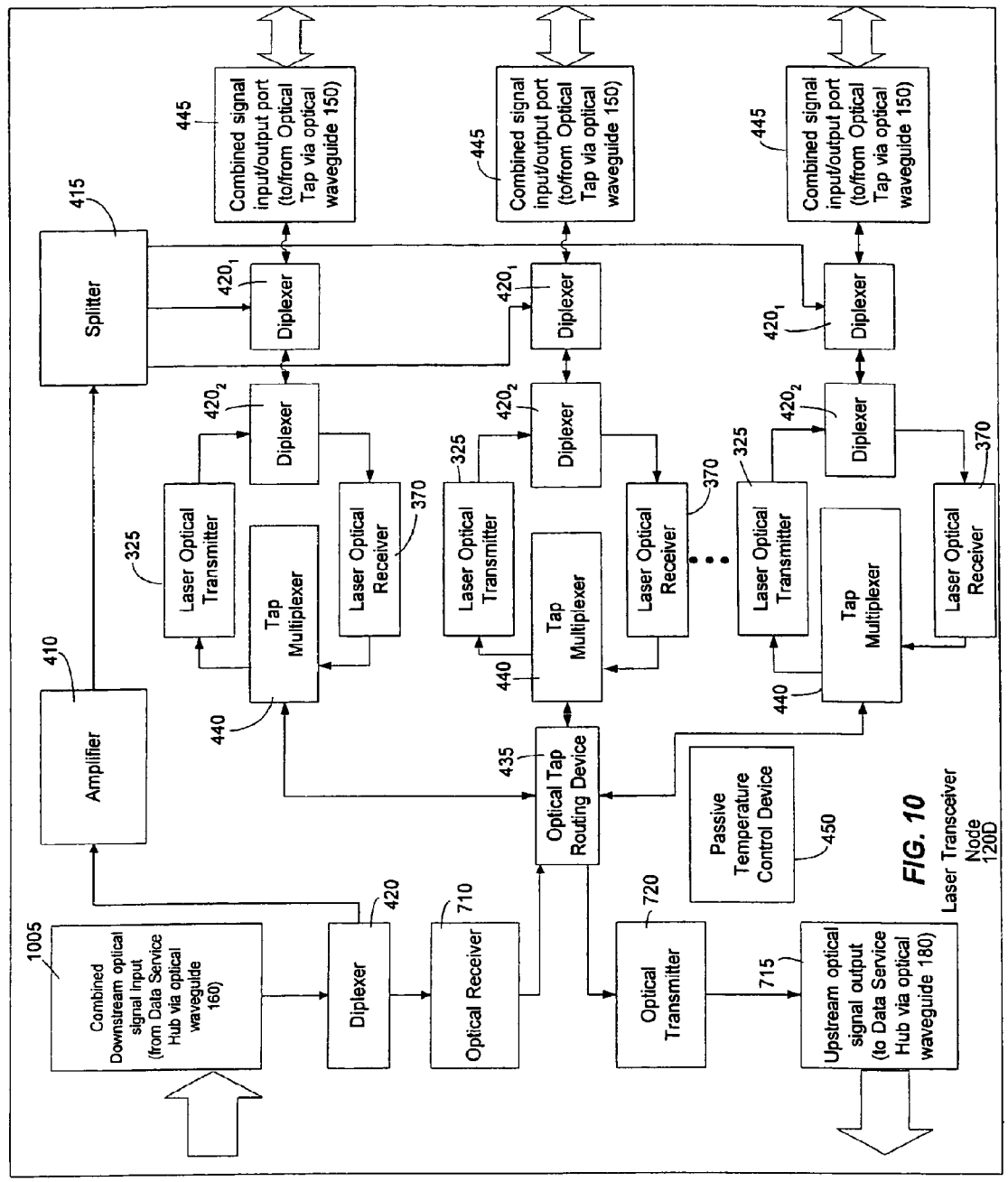
FIG. 10 is a functional block diagram illustrating another exemplary outdoor laser transceiver node that can process a combined downstream signal that comprises downstream optical signals in addition to unidirectional signals like RF transmissions or video data.

FIG. 10 illustrates another exemplary laser transceiver node 120D that can be coupled to the data service hub 110D as illustrated in FIG. 9. In this exemplary embodiment, the laser transceiver node 120D comprises a combined downstream optical signal input 1005 that is coupled to a second optical waveguide 160 that provides a combined downstream optical signal comprising broadcast video services and data service. The laser transceiver node 120D further comprises a diplexer 420 that feeds the broadcast video or RF signals to an amplifier 410. The broadcast video or RF optical signals are then sent to a splitter 415 which then sends the optical signals to the first set of diplexers $420_1$. The combination of the data service hub 110D as illustrated in FIG. 9 and the laser transceiver node 120D as illustrated in FIG. 10 conserves optical waveguides between these two devices.

As noted above, in another exemplary embodiment, it may be possible to use only a single fiber (not shown) to operatively link a data service hub 110 and a laser transceiver node 120. In such an exemplary embodiment, different wavelengths could be used to propagate upstream and downstream optical signals.

Figure 11:
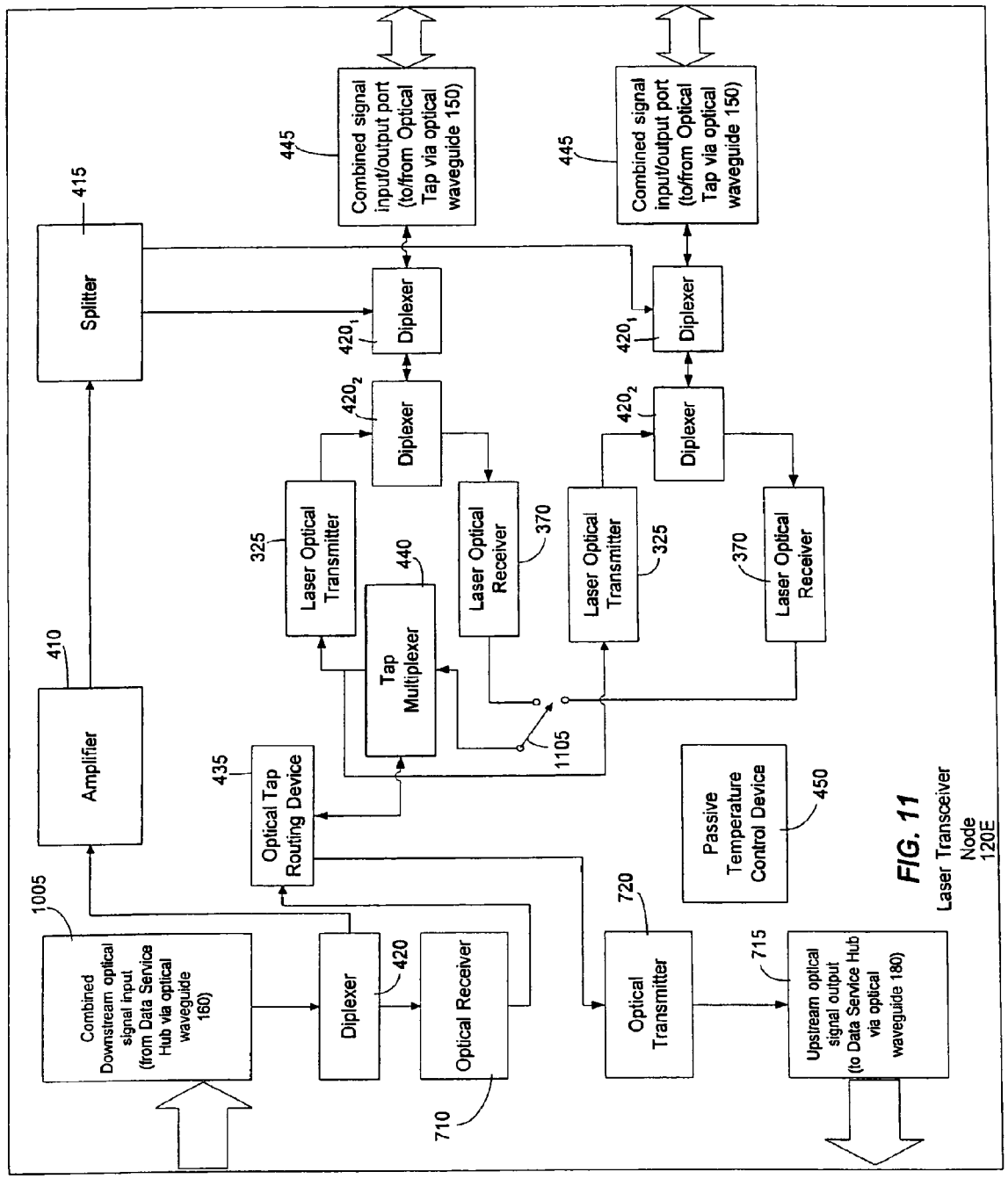
FIG. 11 is a functional block diagram illustrating another exemplary outdoor laser transceiver node that employs dual transceivers between tap multiplexers and respective groups of subscribers.

FIG. 11 is a functional block diagram illustrating another exemplary outdoor laser transceiver node 120E that employs dual transceivers between tap multiplexers 440 and respective groups of subscribers. In this embodiment the downstream optical signals originating from each respective tap multiplexer 440 are split immediately after the tap multiplexer 440. In this exemplary embodiment, each optical transmitter 325 is designed to service only eight subscribers as opposed to sixteen subscribers of other embodiments. But each tap multiplexer 440 typically services sixteen or fewer subscribers.

In this way, the splitting loss attributed to the optical taps 130 can be substantially reduced. For example, in other exemplary embodiments that do not split the downstream optical signals immediately after the tap multiplexer 440, such embodiments are designed to service sixteen or fewer subscribers with a corresponding theoretical splitting loss of approximately 14 dB (including an allowance for losses). With the current exemplary embodiment that services eight or fewer subscribers, the theoretical splitting loss is reduced to approximately 10.5 dB.

In laser transceiver node 120E, the optical receivers 370 cannot be paralleled because at all times one receiver 370 or the other is receiving signals from respective subscribers, while the other receiver 370 is not receiving signals. The receiver 370 not receiving any upstream optical signals could output noise which would interfere with reception from the receiver 370 receiving upstream optical signals. Therefore, a switch 1105 can be employed to select the optical receiver 370 that is currently receiving an upstream optical signal. The tap multiplexer can control the switch 1105 since it knows which optical receiver 370 should be receiving upstream optical signals at any given moment of time.

FIG. 12 is a functional block diagram illustrating another exemplary outdoor laser transceiver node 120F that includes optical taps 130 disposed within the laser transceiver node 120F itself. In this architecture, optical waveguides 150 from each subscriber optical interface 140 can be connected to the laser transceiver node 120F. Typically, the number of optical waveguides 150 that are connected to the laser transceiver node 120F is such that two laser transceiver nodes 150 are needed to support the number of optical waveguides 150. But when less than a maximum number of subscribers exist, one laser transceiver node 120F can be used to service the existing service base. When the service base expands to a number requiring an additional laser transceiver node 120, the additional laser transceiver nodes can be added.

By placing the optical taps 130 within the laser transceiver node 120F, two or more laser transceiver nodes 120F can be co-located with one another for the reason discussed above. In other words, this exemplary embodiment enables two or more laser transceiver nodes 120F to be placed in close proximity to one another. Such placement of laser transceiver nodes 120F can conserve power and result in significant cost savings. Furthermore, with such a co-location design, future expansion of the optical architecture 100 can easily be obtained. That is, one laser transceiver nodes 120F can be installed until more subscribers join the optical network architecture 100 requiring the laser transceiver node. Optical waveguides 150 can be connected to the co-located laser transceiver nodes as more subscribers join the optical network architecture 100.

Figure 13:
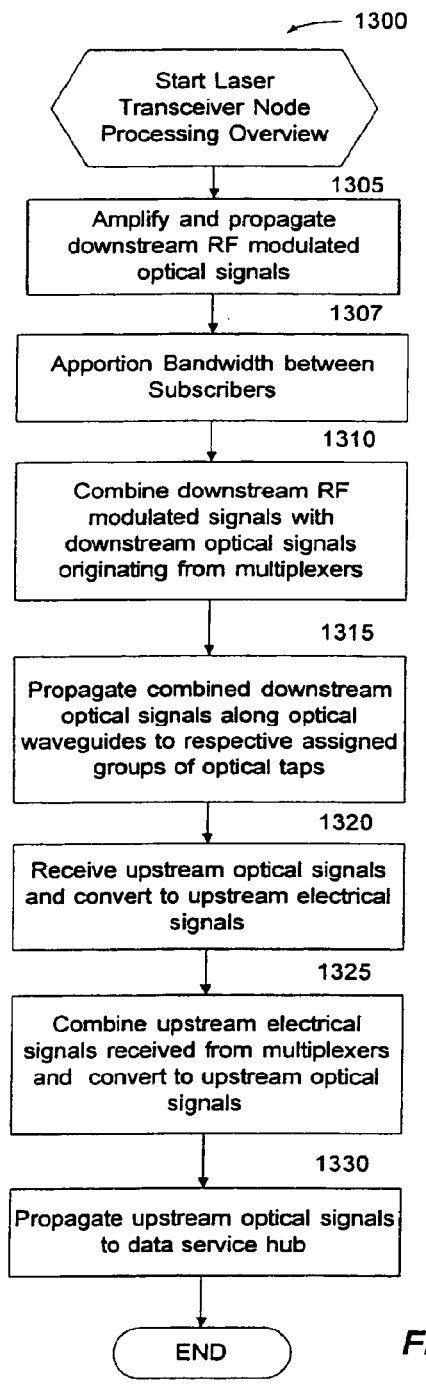
FIG. 13 is a logic flow diagram illustrating an exemplary method for processing unidirectional and bi-directional optical signals with a laser transceiver node of the present invention.

Referring now to FIG. 13, this figure illustrates an exemplary method for processing unidirectional and bi-directional optical signals with a laser transceiver node 120 of the present invention. Basically, FIG. 13 provides an overview of the processing performed by the laser transceiver node 120.

Certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 1305 is the first step in the exemplary laser transceiver node overview process 1300. In step 1305, downstream RF modulated optical signals are amplified by the amplifier 410 as illustrated in FIG. 4. As noted above, the amplifier 410 can comprise an Erbium Doped Fiber Amplifier (EDFA). However, other optical amplifiers are not beyond the scope of the present invention.

Next, in Step 1307, bandwidth between respective subscribers can be apportioned with the optical tap routing device 435. In other words, the optical tap routing device 435 can adjust a subscriber's bandwidth in accordance with a subscription or on an as-needed basis. The optical tap routing device 435 can offer a particular subscriber or groups of subscribers bandwidth in units of 1, 2, 5, 10, 20, 50, 100, 200, and 450 Mb/s.

In Step 1310, the downstream RF modulated optical signals are combined with the downstream optical signals originating from the tap multiplexers 440. The combining of the downstream optical signals can occur in diplexers 420. Subsequently, in Step 1315, the combined downstream optical signals are propagated along the distribution optical waveguides 150 to respective assigned groups of optical taps 200.

In Step 1320, upstream optical signals are received by optical receivers 370 and then converted to upstream electrical signals. The upstream electrical signals are sent to respective tap multiplexers 440. Electrical signals received from respective tap multiplexers 440 are combined in the optical tap routing device 435 according to Step 1325. Also in Step 1325, the upstream electrical signals from the optical tap routing device 435 can be converted into the optical domain with either an optical waveguide transceiver 430 or an optical transmitter 720. In Step 1330, the upstream optical signals are propagated towards the data service hub 110 via a bi-directional optical waveguide 170 or a dedicated upstream optical waveguide 180.

Figure 14:
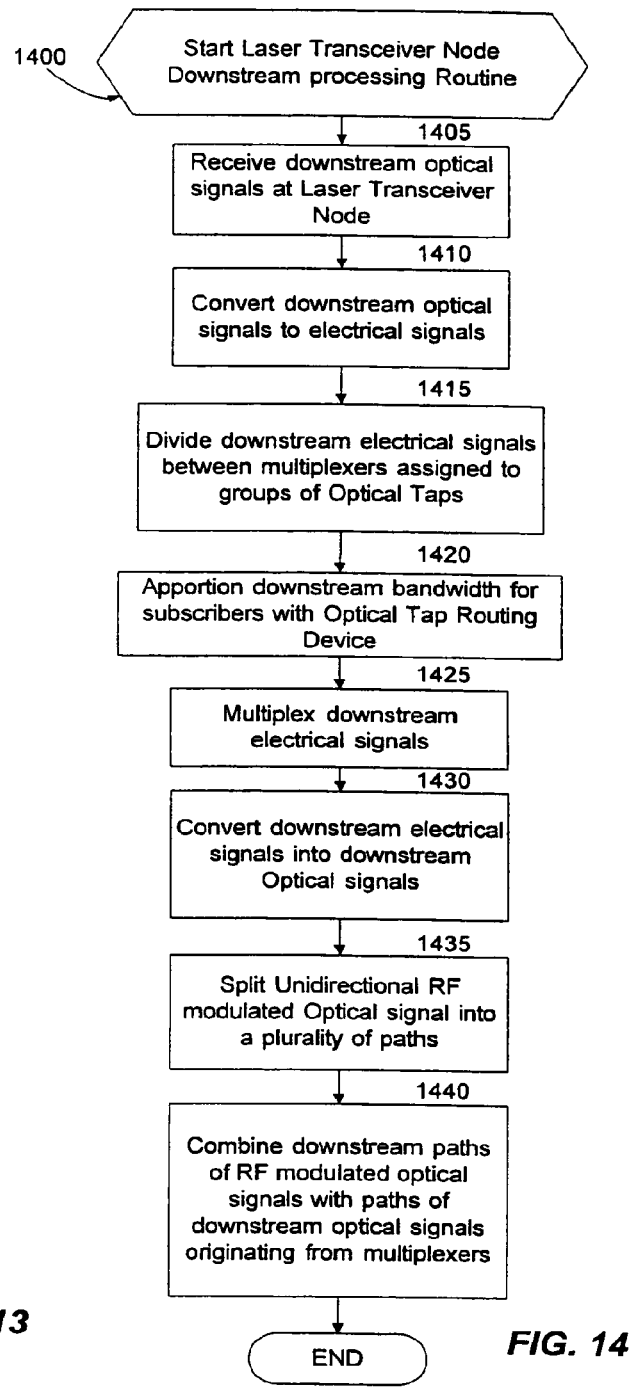
FIG. 14 is a logic flow diagram illustrating an exemplary process for handling downstream optical signals with a laser transceiver node according to the present invention.

Referring now to FIG. 14, this figure illustrates a logic flow diagram of an exemplary process for handling downstream optical signals with a laser transceiver node 120 according to the present invention. More specifically, the logic flow diagram of FIG. 14 illustrates an exemplary method for communicating optical signals from a data service provider 110 to at least one subscriber.

As noted above, certain steps in the process described below must naturally proceed others for the present invention to function as described. However, the present invention is not limited to the order of steps described if such order or sequence does not alter the functionality of the present invention. That is, it is recognized that some steps may be performed before or after other steps without departing from the scope and spirit of the present invention.

Step 1405 is the first step in the exemplary process 1400 for communicating optical signals from a data service provider to at least one subscriber. In step 1405, downstream optical signals are received at the laser transceiver node 120. For example, downstream optical signals can be received at the unidirectional optical signal input port 405 as illustrated in FIG. 4. Further, downstream optical signals can also be received at the bi-directional optical signal input/output port 425 also illustrated in FIG. 4.

Next in Step 1410, the downstream optical signals can be converted to the electrical domain. In other words, the downstream optical signals received at the bi-directional output signal input/output port 425 can be converted into the electrical domain with an optical waveguide transceiver 430. As noted above, the optical waveguide transceiver 430 can comprise an optical/electrical converter. Next, in Step 1415 the optical tap routing device 435 can divide the converted electrical signals between tap multiplexers 440 that are assigned to groups of optical taps 130. In Step 1420, the downstream bandwidth can be apportioned for subscribers with the optical tap routing device 435.

In this step, the optical tap routing device 435 can apportion bandwidth to groups of subscribers based upon a subscription or based upon a current demand. The optical tap routing device 435 can partition the bandwidth in units of 1, 2, 5, 10, 20, 50, 100, 200, and 450 Mb/s. However, the present invention is not limited to these increments. Other increments of bandwidth are not beyond the scope and spirit of the present invention. The optical tap routing device 435 can apportion bandwidth in this way by executing a program defining a protocol for communications with groups of subscribers assigned to single ports. The single ports are connected to the respective tap multiplexers 440.

In Step 1425, the downstream electrical signals processed by the optical tap routing device 435 are multiplexed with the tap multiplexers 440. Subsequently, in Step 1430 the downstream electrical signals can be converted into downstream optical signals with the optical transmitters 325. As noted above, the optical transmitters 325 can comprise one of Fabry-Perot (F-P) lasers, distributed feedback lasers, and Vertical Cavity Surface Emitting Lasers (VCSELs). However, as noted above, other types of lasers are not beyond the scope of the present invention.

In Step 1435 the unidirectional RF modulated optical signals received from the first optical waveguide 160 can be split into a plurality of paths with a splitter 415. Next, in Step 1440 the downstream paths of the RF modulated optical signals are combined with the paths of the downstream optical signals originating from the tap multiplexers 440.

Figures 15, 16, 17:
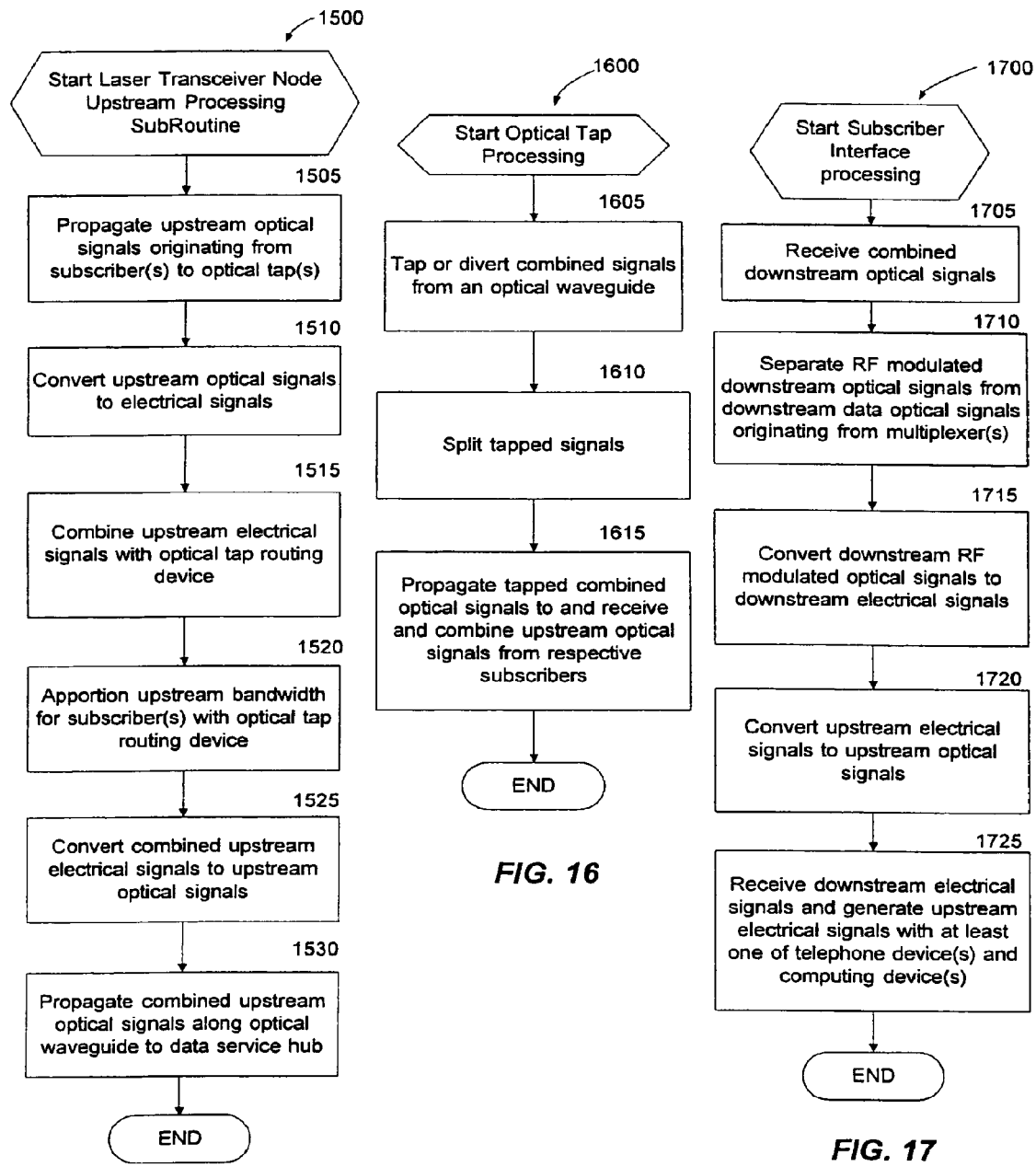
FIG. 15 is a logic flow diagram illustrating an exemplary process for handling upstream optical signals with an exemplary laser transceiver node according to the present invention.
FIG. 16 is a logic flow diagram illustrating the processing of unidirectional and bi-directional optical signals with an optical tap according to the present invention.
FIG. 17 is a logic flow diagram illustrating the processing of unidirectional optical signals and bi-directional optical signals with a subscriber interface according to the present invention.

FIG. 15 illustrates a logic flow diagram of an exemplary process for handling upstream optical signals with an exemplary laser transceiver node 120 according to the present invention. More specifically, FIG. 15 illustrates a process for communicating optical signals from at least one subscriber to a data service provider hub.

As noted above, certain steps in the process described below must naturally proceed others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 1505 is the first step in the exemplary laser transceiver node upstream process 1500. In Step 1505, upstream optical signals originating from subscribers to optical taps 130 are propagated along distribution optical waveguides 150. Next, the upstream optical signals are converted by a optical receiver 370 in Step 1510. In Step 1515, the upstream electrical signals are combined at the optical tap routing device 435. Next, in Step 1520 upstream bandwidth for subscribers is apportioned with the optical tap routing device 435 similar to how the downstream optical bandwidth is apportioned as discussed above with respect to FIG. 14.

For the upstream optical signals, the optical tap routing device 435 can employ time division multiple access (TDMA) in order to service or support signals originating from multiple tap multiplexers 440. As may be apparent to those skilled in the art, in time division multiple access the optical tap routing device 435 switches in time from one tap multiplexer 440 to another tap multiplexer 440. In contrast, for the downstream optical signals, the optical tap routing device 435 employs time division multiplexing (TDM). As is apparent to those skilled in the art, time division multiplexing occurs when the optical tap routing device 435 sends data to multiple tap multiplexers 440. In time division multiplexing, the signal is never removed, so receiving clocks remain synchronized.

In Step 1525, the combined upstream electrical signals are converted to upstream optical signals with either the optical waveguide transceiver 430 or the optical transmitter 720. Next, in Step 1530, the combined upstream optical signals are propagated along an optical waveguide such as the second optical waveguide 170 or third optical waveguide 180 to the data service hub 110.

FIG. 16 is a logic flow diagram illustrating the processing of unidirectional and bi-directional optical signals with an optical tap 130 according to the present invention. As noted above, certain steps in the process described below must naturally proceed others for the present invention to function as described. However, the present invention is not limited to the order of steps described if such order or sequence does not alter the functionality of the present invention. That is, it is recognized that some steps may be performed before or after other steps without departing from the scope and spirit of the present invention.

Step 1605 is the first step in the optical tap process 1600. Step 1605 diverts signals from an optical waveguide such as a distribution optical waveguide 150 coupled to a laser transceiver node to the combined signal input/output port 505. Next in Step 1610 downstream optical signals that were tapped are split with the optical splitter 510. The optical splitter 510 can split the downstream optical signals to one or more subscriber interfaces or other taps or splitters or combination thereof via distribution optical waveguides 150. In Step 1615, the downstream tap combined optical signals can be propagated to and upstream optical signal from respective subscribers can be received and combined with the optical splitter 510.

FIG. 17 is a logic flow diagram illustrating exemplary processing of unidirectional optical signals and bi-directional optical signals with a subscriber optical interface 140 according to the present invention. As noted above, certain steps in the process described below must naturally proceed others for the present invention to function as described. However, the present invention is not limited to the order of steps described if such order or sequence does not alter the functionality of the present invention. That is, it is recognized that some steps may be performed before or after other steps without departing from the scope and spirit of the present invention.

Step 1705 is the first step in the subscriber optical interface process 1700. In Step 1705, combined downstream optical signals are received with an optical diplexer 515. Next, in Step 1710, the RF modulated downstream optical signals are separated from the downstream data optical signals originating from the tap multiplexers 440. In Step 1715, the downstream RF modulated optical signals are converted to downstream electrical optical signals with an analog optical receiver 525. As noted above, the analog optical receiver 525 can handle both analog modulated signals in addition to digitally modulated signals for digital TV applications.

In Step 1720, the upstream electrical signals are converted to optical signals with the digital optical transmitter 530. As noted above, the digital optical transmitter 530 can comprise one of a Fabry-Perot (F-P) laser, a distributed feedback (DFB) laser, and a vertical cavity surface emitting laser (VCSEL) or other similar lasers. The upstream electrical signals can be generated from a telephone input/output port 555 or a data interface 560 or both (as discussed above).

In Step 1725, downstream electrical signals emitted from the digital optical receiver 540 are received by a processor 550. The processor 550, in turn, propagates these electrical signals to appropriate output devices such as the telephone input/output port 555 or data interface 560 or both. As noted above, the telephone input/output port 555 or the data interface 560 or both can generate upstream electrical signals that are sent to the processor 550 and then converted into the optical domain with the digital optical transmitter 530.

Those skilled in the art will appreciate that the optical network architecture 100 of the present invention can provide at least one of video, telephone, and computer communication services via the optical signals. Also, those skilled in the art will appreciate that the video layer comprising the RF modulated signals can be removed from the exemplary optical network architecture 100 without departing from the scope and spirit of the present invention.

With the present invention, an all fiber optical network and method that can propagate the same bit rate downstream and upstream to/from a network subscriber are provided. Further, the present invention provides an optical network system and method that can service a large number of subscribers while reducing the number of connections at the data service hub.

The present invention also provides an active signal source that can be disposed between a data service hub and a subscriber and that can be designed to withstand outdoor environmental conditions. The present invention can also be designed to hang on a strand or fit in a pedestal similar to conventional cable TV equipment that is placed within a last mile of a communications network. The system and method of the present invention can receive at least one Gigabit or faster Ethernet communications in optical form from a data service hub and partition or apportion this optical bandwidth into distribution groups of a predetermined number. The system and method of the present invention can allocate additional or reduced bandwidth based upon the demand of one or more subscribers on an optical network. Additionally, the optical network system of the present invention lends itself to efficient upgrading that can be performed entirely on the network side. In other words, the optical network system allows upgrades to hardware to take place in locations between and within a data service hub and an active signal source disposed between the data service hub and a subscriber.

It should be understood that the foregoing relates only to illustrate the embodiments of the present invention, and that numerous changes may be made therein without departing from the scope and spirit of the invention as defined by the following claims.

What is claimed is:

1. An optical network system comprising:
   a data service hub for sending downstream optical signals on an optical waveguide;
   an optical tap for passively extracting and dividing downstream optical signals between a plurality of optical waveguides coupled to a plurality of subscriber optical interfaces, and the optical tap passively combining upstream optical signals received from one or more subscriber optical interfaces, the optical tap comprising an optical splitter, the optical tap passively extracting and dividing the downstream optical signals without any optical to electrical conversions, the optical tap passively combining the upstream optical signals without any optical to electrical conversions;
   each subscriber optical interface providing electrical communications to a subscriber, each subscriber optical interface coupled to a respective optical tap receives identical downstream optical signals, each subscriber optical interface coupled to a respective optical tap by an optical waveguide, for receiving the downstream optical signals from a respective optical tap and converting the downstream optical signals into downstream electrical signals; and
   a laser transceiver node disposed between the data service hub and the optical tap, for communicating a first set of optical signals to and from the data service hub and a second set of optical signals to and from a respective optical tap, for apportioning bandwidth that is shared between groups of subscriber optical interfaces connected to a respective optical tap, the laser transceiver node further comprising: a plurality of optical transmitters and optical receivers; a plurality of bi-directional splitters for receiving downstream and upstream optical signals, each bi-directional splitter coupled to a respective optical transmitter and a respective optical receiver; an optical transceiver coupled to the optical waveguide for converting downstream optical signals from the optical waveguide into downstream electrical signals, for converting upstream electrical signals into optical signals; a routing device coupled to each optical transmitter and the optical transceiver, for apportioning bandwidth in the electrical domain between subscribers and using a look-up table for processing both upstream and downstream electrical signals, for assigning downstream electrical signals received from the optical transceiver to predetermined optical transmitters, for combining upstream electrical signals from respective optical receivers into one electrical signal that modulates the optical transceiver.

2. The optical network system of claim 1, wherein the optical receivers convert upstream optical signals from a respective optical tap into upstream electrical signals.

3. The optical network system of claim 1, wherein the optical transmitters convert downstream electrical signals into downstream optical signals.

4. The optical network system of claim 1, wherein each subscriber optical interface receives upstream electrical signals from a subscriber and converts the upstream electrical signals into upstream optical signals and sends the upstream optical signals over an optical waveguide towards a corresponding optical tap.

5. The optical network system of claim 1, wherein each optical tap combines upstream optical signals received from a plurality of optical waveguides and propagates the combined upstream optical signals over a single optical waveguide.

6. The optical network system of claim 1, wherein the laser transceiver node accepts gigabit Ethernet optical signals from the data service hub and partitions the Ethernet optical signals into a predetermined number of groups.

7. The optical network system of claim 1, wherein each optical transmitter comprises one of a Fabry-Perot laser, a distributed feedback laser, and a vertical cavity surface emitting laser (VCSEL).

8. The optical network system of claim 1, wherein the optical tap routing device manages upstream and downstream data protocols.

9. The optical network system of claim 8, wherein one of the protocols comprises a time division multiple access protocol.

10. The optical network system of claim 1, wherein data bit rates for the upstream and downstream optical signals are substantially symmetrical.

11. An optical network system comprising:
    an optical tap for passively extracting and dividing downstream optical signals between a plurality of optical waveguides coupled to a plurality of subscriber optical interfaces, and the optical tap passively combining upstream optical signals received from one or more subscriber optical interfaces, the optical tap comprising an optical splitter, the optical tap passively extracting and dividing the downstream optical signals without any optical to electrical conversions, the optical tap passively combining the upstream optical signals without any optical to electrical conversions;
    each subscriber optical interface providing electrical communications to a subscriber, each subscriber optical interface coupled to a respective optical tap receives identical downstream optical signals, each subscriber optical interface coupled to a respective optical tap by an optical waveguide, for receiving the downstream optical signals from a respective optical tap and converting the downstream optical signals into downstream electrical signals; and
    a laser transceiver node disposed between the data service hub and the optical tap, for communicating a first set of optical signals to and from the data service hub and a second set of optical signals to and from a respective optical tap, the laser transceiver node further comprising: a plurality of optical transmitters and optical receivers; a plurality of bi-directional splitters for receiving downstream and upstream optical signals, each bi-directional splitter coupled to a respective optical transmitter and a respective optical receiver; an optical transceiver coupled to the optical waveguide for converting downstream optical signals from the optical waveguide into downstream electrical signals, for converting upstream electrical signals into optical signals; a routing device coupled to each optical transmitter and the optical transceiver, for apportioning bandwidth in the electrical domain between subscribers and using a look-up table for processing both upstream and downstream electrical signals, for assigning downstream electrical signals received from the optical transceiver to predetermined optical transmitters, for combining upstream electrical signals from respective optical receivers and for modulating the optical transceiver.

12. The optical network system of claim 11, further comprising a data service hub for sending downstream optical signals on an optical waveguide.

13. The optical network system of claim 11, wherein the laser transceiver node apportions bandwidth that is shared between groups of subscriber optical interfaces connected to a respective optical tap.

14. The optical network system of claim 11, wherein the laser transceiver node combines the upstream electrical signals from respective optical receivers into one electrical signal that modulates the optical transceiver.

15. The optical network system of claim 11, wherein the optical tap routing device manages upstream and downstream data protocols.

16. A system for supporting optical communications comprising:
- optical tap means for passively extracting and dividing downstream optical signals between a plurality of optical waveguides coupled to a plurality of subscriber optical interfaces, and the optical tap means passively combining upstream optical signals received from one or more subscriber optical interfaces, the optical tap means passively extracting and dividing the downstream optical signals without any optical to electrical conversions, the optical tap means passively combining the upstream optical signals without any optical to electrical conversions;
- each subscriber optical interface providing electrical communications to a subscriber, each subscriber optical interface coupled to a respective optical tap receives identical downstream optical signals, each subscriber optical interface coupled to a respective optical tap by an optical waveguide, for receiving the downstream optical signals from a respective optical tap and converting the downstream optical signals into downstream electrical signals; and
- a laser transceiver node means disposed between the data service hub and the optical tap, for communicating a first set of optical signals to and from the data service hub and a second set of optical signals to and from a respective optical tap, the laser transceiver node means further comprising: a plurality of optical transmitters and optical receivers; a plurality of bi-directional splitters for receiving downstream and upstream optical signals, each bi-directional splitter coupled to a respective optical transmitter and a respective optical receiver; an optical transceiver coupled to the optical waveguide for converting downstream optical signals from the optical waveguide into downstream electrical signals, for converting upstream electrical signals into optical signals; a routing device coupled to each optical transmitter and the optical transceiver, for apportioning bandwidth in the electrical domain between subscribers and using a look-up table for processing both upstream and downstream electrical signals, for assigning downstream electrical signals received from the optical transceiver to predetermined optical transmitters, the laser transceiver node means combining upstream electrical signals from respective optical receivers and for modulating the optical transceiver.

17. The system of claim 16, wherein the optical tap means comprises an optical splitter.

18. The system of claim 16, further comprising a data service hub for sending downstream optical signals on an optical waveguide to the optical tap means.

19. The system of claim 16, wherein the laser transceiver node means apportions bandwidth that is shared between groups of subscriber optical interfaces connected to a respective optical tap.

20. The system of claim 16, wherein the laser transceiver node means combines the upstream electrical signals from respective optical receivers into one electrical signal that modulates the optical transceiver.

* * * * *